US007636771B2

(12) United States Patent
Torii

(10) Patent No.: US 7,636,771 B2
(45) Date of Patent: Dec. 22, 2009

(54) NETWORK MANAGEMENT SERVER, CONTROL METHOD, COMPUTER PROGRAM, COMPUTER READABLE STORAGE MEDIUM, AND NETWORK SYSTEM

(75) Inventor: Minoru Torii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 11/548,771

(22) Filed: Oct. 12, 2006

(65) Prior Publication Data

US 2007/0088814 A1 Apr. 19, 2007

(30) Foreign Application Priority Data

Oct. 18, 2005 (JP) ............... 2005-303709

(51) Int. Cl.
*G06F 15/16* (2006.01)
(52) U.S. Cl. ..................................... 709/219
(58) Field of Classification Search ............... 709/223, 709/219
See application file for complete search history.

(56) References Cited

U.S. PATENT DOCUMENTS

| 6,389,464 | B1* | 5/2002 | Krishnamurthy et al. .... 709/220 |
| 6,426,959 | B1* | 7/2002 | Jacobson et al. ............ 370/468 |
| 7,047,088 | B2* | 5/2006 | Nakamura et al. ............ 700/19 |
| 7,370,097 | B2* | 5/2008 | Hashimoto ................... 709/223 |
| 2003/0204590 | A1 | 10/2003 | Torii ........................... 709/224 |
| 2004/0215754 | A1 | 10/2004 | Orleth et al. ................. 709/223 |
| 2006/0155825 | A1 | 7/2006 | Torii ........................... 709/217 |
| 2007/0088814 | A1 | 4/2007 | Torii ........................... 709/223 |

FOREIGN PATENT DOCUMENTS

JP 2004-303252 10/2004

* cited by examiner

*Primary Examiner*—Quang N. Nguyen
*Assistant Examiner*—Tesfay Yohannes
(74) *Attorney, Agent, or Firm*—Fitzpatrick, Cella, Harper & Scinto

(57) ABSTRACT

Even in a large-scale network environment in which many clients and many devices exist on a network, this invention allows the network to function as an aggregation of logical small-scale networks in the execution of device driver setup. For this purpose, a management server manages a plurality of clients on the network as client groups, and a plurality of network devices as device groups. The management server then associates each client group with each device group. When a network device belonging to the device group A is newly installed and the power supply is turned on, the network device issues a Hello message indicating entry to the network. Upon receiving the Hello message, the management server transmits a setup request message for a device driver for the network device to only each client belonging to the client group A.

9 Claims, 23 Drawing Sheets

F I G. 7
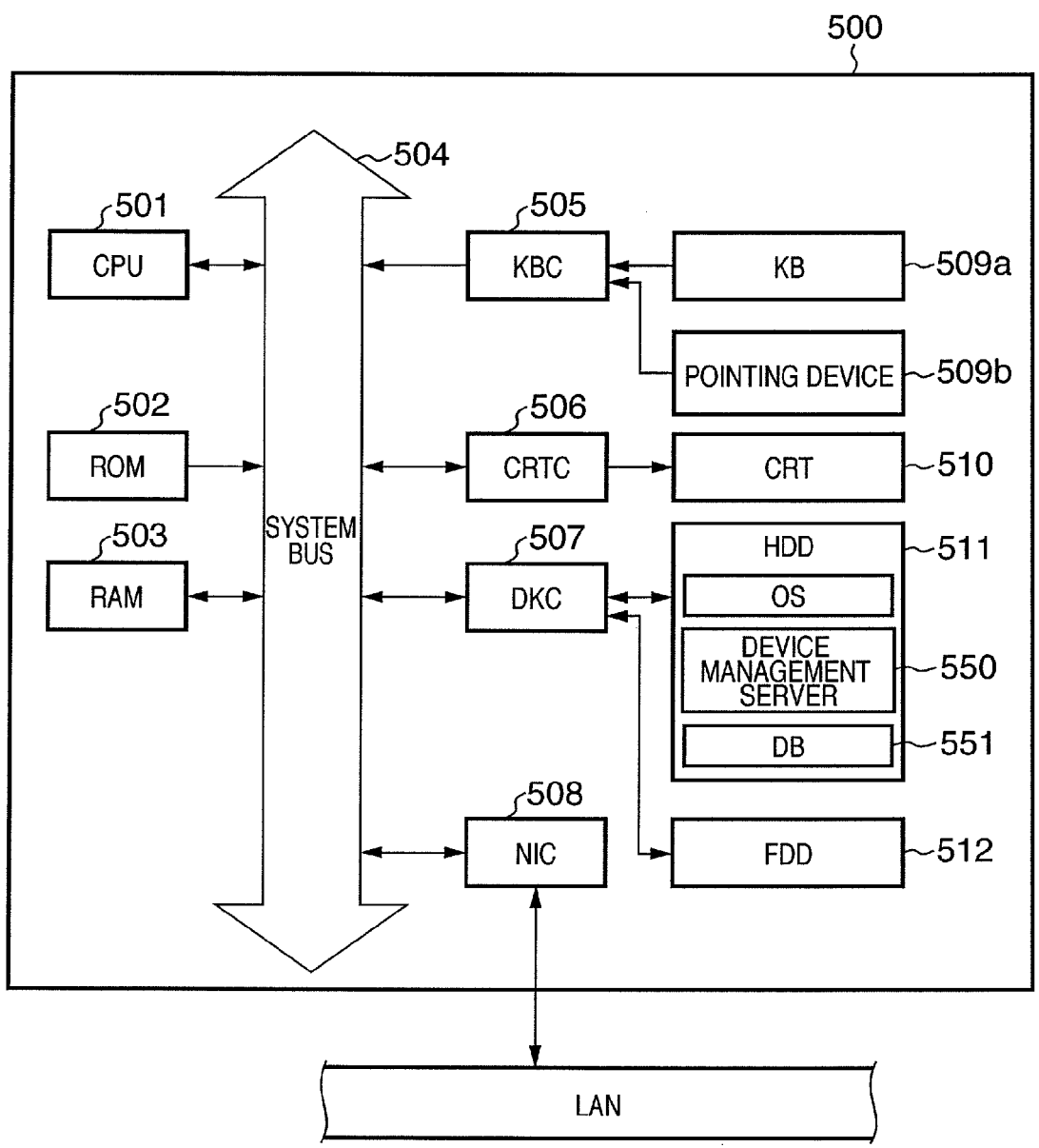

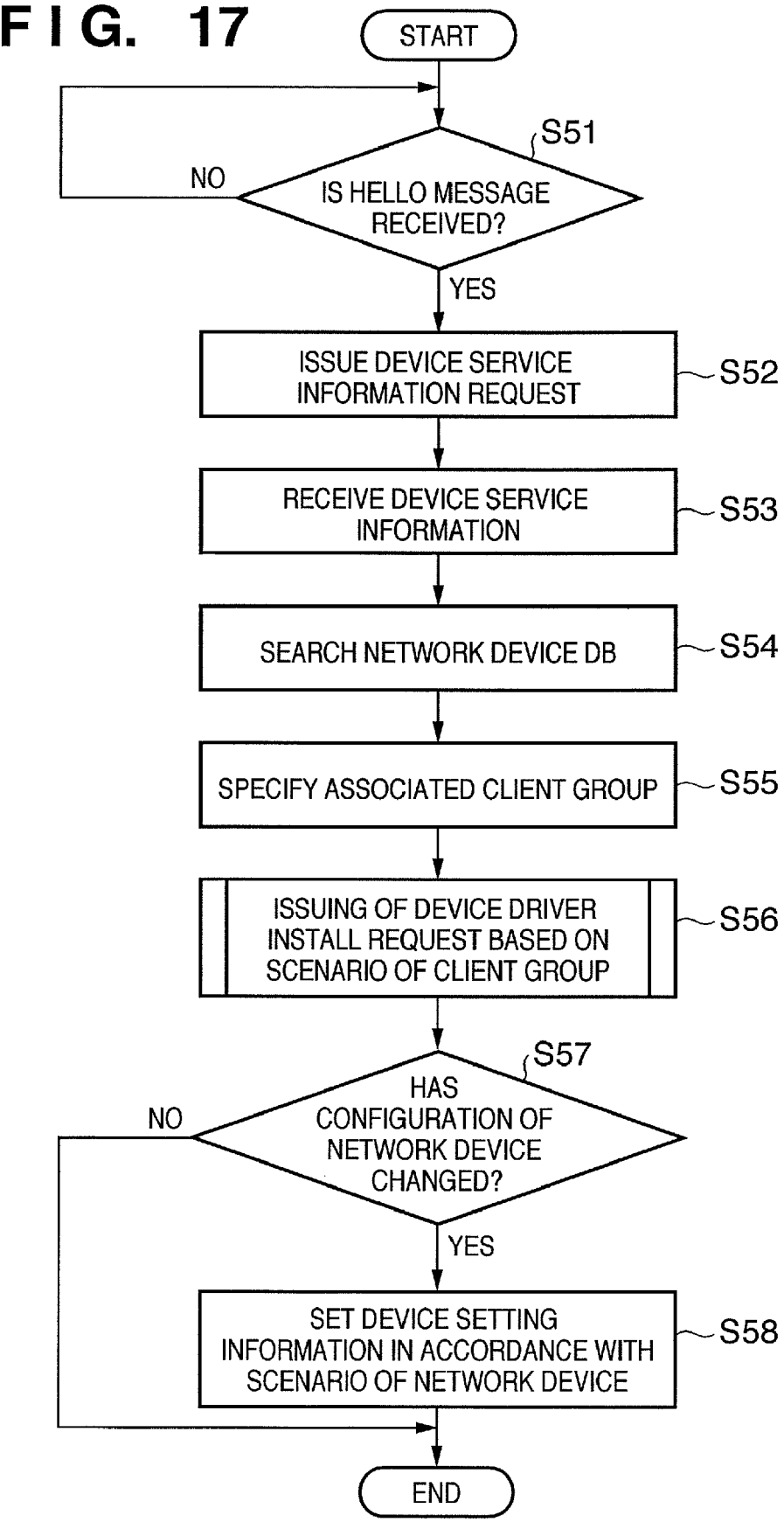

FIG. 18

```
<s:Envelope ... >
    <s:Header ... >
        <a:Action ... >
            http://schemas.xmlsoap.org/ws/2005/04/discovery/Hello
        </a:Action>
        <a:MessageID ... >xs:anyURI</a:MessageID>
        [<a:RelatesTo RelationshipType="d:Suppression">
            xs:anyURI
        </a:RelatesTo>]?
        <a:To ... >urn:schemas-xmlsoap-org:ws:2005:04:discovery</a:To>
        <d:AppSequence ... />
        ...
    </s:Header>
    <s:Body ... >
        <d:Hello ... >
            <a:EndpointReference> ... </a:EndpointReference>
            [<d:Types>list of xs:QName</d:Types>]?
            [<d:Scopes>list of xs:anyURI</d:Scopes>]?
            [<d:XAddrs>list of xs:anyURI</d:XAddrs>]?
            <d:MetadataVersion>xs:unsignedInt</d:MetadataVersion>
            ...
        </d:Hello>
    </s:Body>
</s:Envelope>
```

FIG. 19

```
<s12:Envelope
    xmlns:s12='http://www.w3.org/2003/05/soap-envelope'
    xmlns:wsa='http://schemas. xmlsoap.org/ws/2004/08/addressing'
    xmlns:wsp='http://schemas. xmlsoap.org/ws/2004/09/mex'>
  <s12:Header>
    <wsa:Action>
        http://schemas. xmlsoap.org/ws/2004/09/mex/GetMetadata/Request
    </wsa:Action>
    <wsa:MessageID>
        uuid:73d7edfc-5c3c-49b9-ba46-2480caee43e9
    </wsa:MessageID>
    <wsa:ReplyTo>
       <wsa:Address>http://client.example.com/MyEndpoint</wsa:Address>
    </wsa:ReplyTo>
    <wsa:To>http://server.example.org/YourEndpoint</wsa:To>
    <ex:MyRefProp xmlns:ex='http://server.example.org/refs'>
        78f2dc229597b529b81c4bef76453c96
    </ex:MyRefProp>
  </s12:Header>
  <s12:Body>
    <wsx:GetMetadata>
      <wsx:Dialect>
            http://aaa.bbb.com/printer/DeviceData
      </wsx:Dialect>
    </wsx:GetMetadata>
  </s12:Body>
</s12:Envelope>
```

FIG. 20

```
<s12:Envelope
    xmlns:s12='http://www.w3.org/2003/05/soap-envelope'
    xmlns:wsa='http://schemas.xmlsoap.org/ws/2004/08/addressing'
    xmlns:wsp='http://schemas.xmlsoap.org/ws/2004/09/policy'
    xmlns:wsx='http://schemas.xmlsoap.org/ws/2004/09/mex'>
  <s12:Header>
    <wsa:Action>
      http://schemas.xmlsoap.org/ws/2004/09/mex/GetMetadata/Response
    </wsa:Action>
    <wsa:RelatesTo>
      uuid:73d7edfc-5c3c-49b9-ba46-2480caee43e9
    </wsa:RelatesTo>
    <wsa:To>http://client.example.com/MyEndpoint</wsa:To>
  </s12:Header>
  <s12:Body>
    <wsx:Metadata>
      <wsx:MetadataSection
        Dialect='http://aaa.bbb.com/printer/DeviceData'>
          <DeviceData>
              <Manufacturer>xxx company</Manufacturer>
              <ModelName>NetworkPrinter123</ModelName>
              <color>1</color>
              <fax>1</fax>
              <location>Design Dev 1</location>
              <EnableEMaint>1</EnableEMaint>
              <EnableAssetManagement>1</EnableAssetManagement>
          </DeviceData>
      </wsx:MetadataSection>
    </wsx:Metadata>
  </s12:Body>
</s12:Envelope>
```

NETWORK MANAGEMENT SERVER, CONTROL METHOD, COMPUTER PROGRAM, COMPUTER READABLE STORAGE MEDIUM, AND NETWORK SYSTEM

BACKGROUND OF THE INVENTION

1. Field of the Invention

The present invention relates to a technique of managing clients and network devices on a network.

2. Description of the Related Art

Conventionally, as a method of managing network devices, a method using SNMP/MIB has been known. SNMP (Simple Network Management Protocol) is a protocol for managing devices connected to a network through the network. Network management by SNMP is implemented by UDP communication between a manager and an agent resident in a management target device. In response to a request from the manager, the agent returns a response. An MIB (Management Information Base) is a database which exists in a network device corresponding to SNMP and stores management information about the network device. In response to a request from the manager, the agent returns information in the MIB. This allows the manager to detect which kind of device the network device of interest is and which function the device has.

Recently, a small-scale intranet environment for network devices has increased to a large-scale intranet environment which performs port control by using a router or the like. In addition, the intranet environment tends to connect to an Internet environment connected to external environments. Along with this tendency, a transition has occurred from network device management using SNMP/MIB to device management using Web services.

With the widespread use of Web services, it is necessary to improve user-friendliness and ease of use in terms of the use of network compliant devices. For this purpose, there have been proposed various protocols and architectures including search means for network devices which provide services, and automatic setup means (Plug and Play means) such as application software for controlling network compliant devices, utility software, and operating systems (e.g., Japanese Patent Laid-Open No. 2004-303252).

A plurality of enterprises and standardization organizations have been trying to establish specifications to apply Plug and Play functions, which have been applied to local I/O connection devices, to network devices.

For example, such specifications include UPnP (Universal Plug and Play) which has been mainly developed by Microsoft, USA, WSD (Web Services for Devices (WS-Discovery/WS-MetadataExchange)), MBLinks which has been progressed by Japan Business Machine Makers Industrial Association (JBMIA), and Renedzvous supported by OS X developed by Apple Computer, USA.

When a network device such as a network compliant UPnP device is connected to a network, a device driver corresponding to the network device is automatically installed in the PC. That is, this technique can be regarded as very useful.

This technique, however, may contrarily cause some inconvenience in an enterprise environment, i.e., a network including many network devices such as PCs and printers. This is because, when many network devices exist on a network, device drivers for these many devise are installed in each PC to wastefully consume the limited memory of each PC. In general, when performing printing, the user uses at most one or two printers as network devices. The above problem can therefore be easily imagined.

In addition, it takes some time to install a device driver. When many devices are newly connected to the network, such installation processing is performed many times. The time required for the installation cannot be neglected any more. This may also cause some trouble in operation using PCs.

Furthermore, in an enterprise environment or the like, a device having a FAX function is installed for each unit, such as a department, a room, or a floor. In this case, different pieces of address information (destination facsimile numbers) must be set for the respective units. An enterprise includes a division mainly engaged in designing. When a network color printer is newly installed in such a division, a color profile desired by the division is set in the printer. Up to now, an IT administrator or the like has manually performed various settings in such a network device. That is, the operation load on such a person has increased more and more.

SUMMARY OF THE INVENTION

The present invention has been made in consideration of the above problems. It is an object of the present invention to allow even a large-scale network environment in which many clients and devices exist on a network to function as an aggregation of logical small-scale networks for device driver setup, and to provide a technique of automating device driver setup in a logical small-scale network.

In order to achieve the above object, a network management apparatus of the present invention includes the following configuration.

There is provided a network management apparatus for managing a plurality of client apparatuses and a plurality of network devices, comprising storage management means for storing and managing client group information indicating to which client group each of the plurality of client apparatuses belongs, and device group information indicating to which device group each of the plurality of network devices belongs, and stores logical connection information between a client group and a device group, specifying means for, when receiving a predetermined network connection message from a network device through the network, determining to which device group the network device which has issued the network connection message belongs by referring to the storage management means, and specifying a client group in a logical connection with the determined device group, and transmission means for transmitting a setup request message for a device driver corresponding to the network device which has issued the network connection message to each client apparatus as a constituent member of the client group specified by the specifying means.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a block diagram showing the configuration of a management server in this embodiment;

FIG. 17 is a flowchart showing a processing procedure executed by a management server in this embodiment;

FIG. 18 is a view showing an example of a Hello message issued by a network device;

FIG. 19 is a view showing an example of a device service request message requested to a network device by the management server;

FIG. 20 is a view showing an example of device service information returned by a network device;

DESCRIPTION OF THE EMBODIMENTS

The embodiments of the present invention will be described in detail below with reference to the accompanying drawings.

Figure 1:
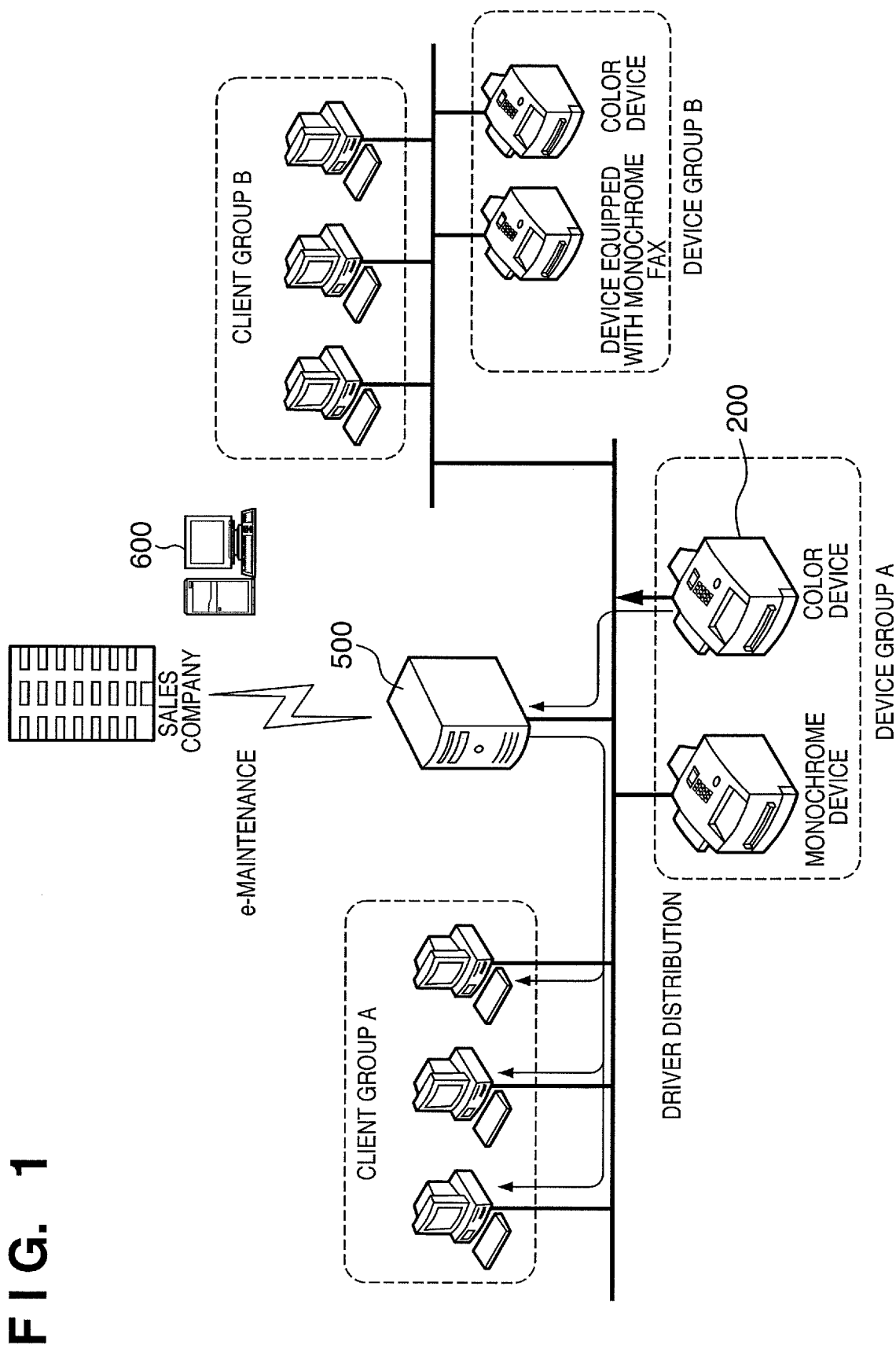
FIG. 1 is a view showing the configuration of a network system in an embodiment.

FIG. 1 is a schematic diagram showing the connection form of an overall network system according to an embodiment.

As shown in FIG. 1, in this embodiment, for each organizational system (department) or location (floor or room), a client group of clients belonging thereto is defined. In addition, concerning each network device which a client uses, some device group is defined. FIG. 1 shows a case wherein client groups and device groups are classified into two groups A and B.

An object of this embodiment is to associate the client group A with the device group A and associate the client group B with the device group B. In order to make each client belonging to the same group use only the network devices belonging to the associated device group, the corresponding device drivers are installed in each client. This embodiment is configured to automate this operation without demanding the user of each client to perform any specific operation. A network device management server (to be simply referred to as a management server hereinafter) 500 shown in FIG. 1 performs this series of operations.

Note that the management server 500 has a function of assigning resource numbers to network devices, monitoring the states of the devices, and notifying a maintenance server 600 installed by a sales management company of the monitored information. This makes it possible to implement e-maintenance services such as replenishing paper sheets, toner, and the like, and repairs for failures.

Assume that a network device in this embodiment is a multi-function peripheral device having a print function (print server), original reading function (scanner server), and copy function. Assume also that this multi-function peripheral device can mount an option FAX board (print board) as an option which implements a FAX function.

In addition, UPnP and WSD (Web Services for Devices) which Microsoft, USA has mainly tried to establish will be exemplified as techniques of searching for network devices. However, as similar techniques, it suffices to use BMLinks which has been progressed by Japan Business Machine Makers Industrial Association (JBMIA) and Renedzvous supported by OS X developed by Apple Computer, USA.

Although each client will be described as a personal computer (PC), it may be a mobile terminal such as a PDA. For the sake of simplicity, Windows provide by Microsoft, USA will be exemplified as an OS (Operating System) to be installed in each client.

A procedure for a search based on the WSD specifications between a client and a network compliant device and a general procedure for the installation of a device driver for the network compliant device will be briefly described with reference to FIGS. 2A and 2B.

Figure 2A:
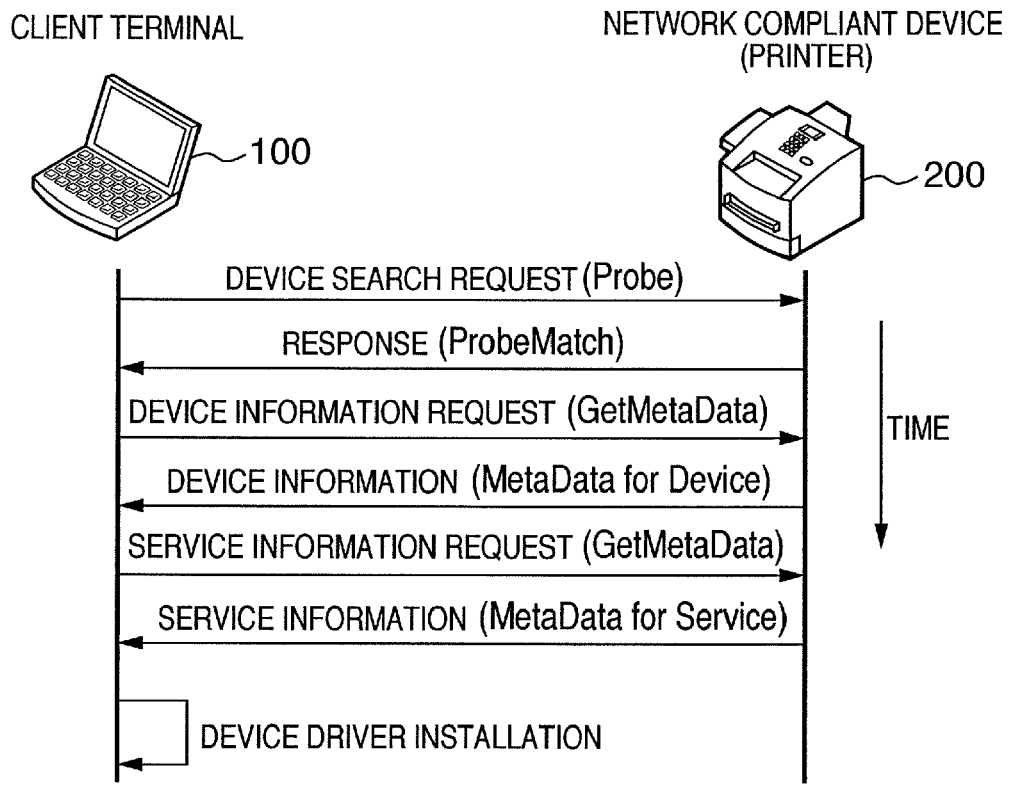
FIGS. 2A and 2B are views showing a general sequence from the instant at which a UPnP network device is found to the instant at which a corresponding device driver is installed.

FIG. 2A shows a procedure to be executed when a client terminal 100 connects to the network or the user inputs an instruction to search for a network device.

The client terminal 100 multicasts (broadcasts) a Probe message as a device search request to a network. Upon receiving this Probe message, a network device 200 unicasts a response message (ProbeMatch) to the client terminal 100 in response to the message. Since the device and the terminal have known their communication destinations, subsequent transmission/reception is unicast.

By receiving the above response message, the client terminal 100 can detect the presence of the network device 200 on the network. Therefore, the process proceeds to the next step to transmit (unicast) device information request message (GetMetaData) to the network compliant device and acquire device information (MetaData for Device). Subsequently, the client terminal 100 transmits a service information request message (GetMetaData), and acquires service information (MetaData for Service).

As a result of the above operation, the client terminal 100 can obtain the model name and attribute information (information indicating that the device is a printer) of the network device 200. The client terminal 100 can therefore issues, to the OS, a request to execute setup processing for the installation of a corresponding device driver (a printer driver in the above case) Note that in this setup processing, if the corresponding device driver has already been installed, the installation processing is not performed.

Figure 2B:
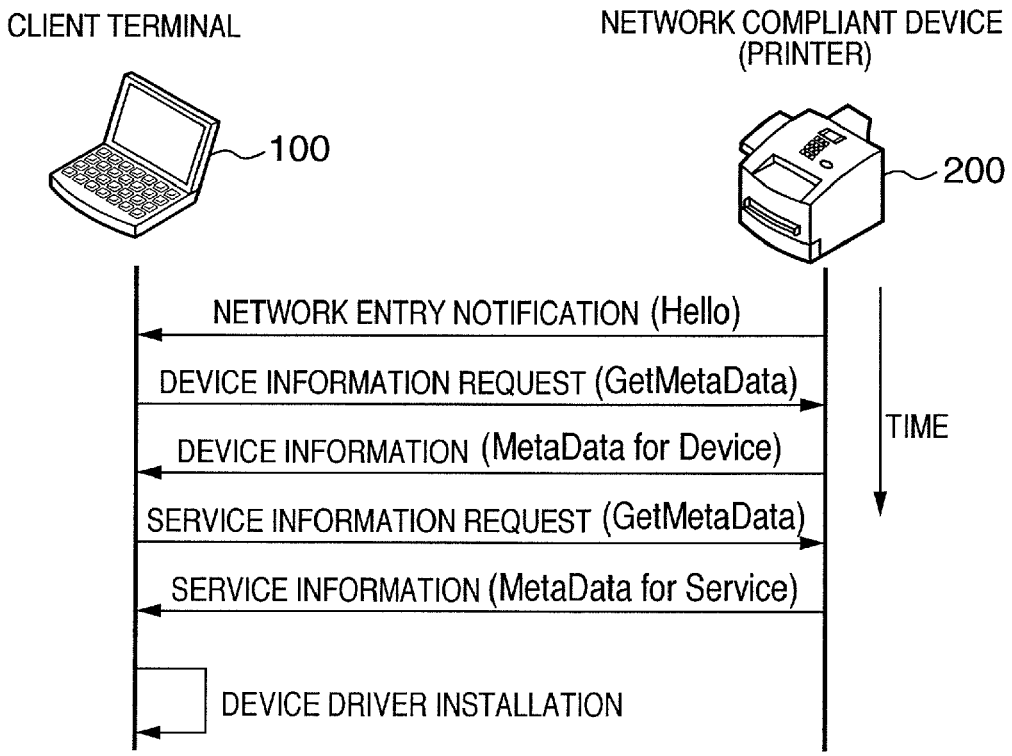

FIG. 2B shows a procedure to be executed in a case wherein after completing connection to the network, the client terminal 100 makes the network device 200 enter the network. The entry of the network device 200 to the network can be easily understood as being analogous to the power-on of the network device 200. In addition, this situation corresponds to a case wherein a network device is newly installed or the device is powered on upon mounting of an option board.

First of all, the network device multicasts an entry message (Hello) for entry to the network. By receiving this entry message, the client terminal 100 detects the presence of the network compliant device 200, and hence transmits a device information request message. The subsequent procedure is the same as that in FIG. 2A.

Since the client terminal 100 detects an unknown network compliant device and then has a device driver automatically installed in it, the operation load on the user decreases. If, however, many network devices exist on the network, many network devices on the network are searched out in either of the cases in FIGS. 2A and 2B, and many device drivers are sequentially installed in the terminal in the end. Since it takes several ten sec to several min to install one device driver, it requires a long period of time for the user to perform essential operation using the client terminal 100. The worst of it is that the memory is consumed by unnecessary device drivers, and a trouble may occur in essential operation.

In this embodiment, therefore, as described above, in a situation in which grouping has been performed as shown in FIG. 1, each client belonging to the client group A allows only device drivers for network devices belonging to the device group A to be installed. This solves the above problem and reduces the operation load on the IT administrator.

First of all, assume that each client in this embodiment does not or cannot transmit the above Probe message on the network. Assume also that each client has been set to return no response to a Hello message (discard a received Hello message). Assume, however, that each client has been set to respond to only a request from the management server 500. This processing is handled by installing software (resident application program) (to be described later) in each client.

<Explanation of Apparatus Configuration>

The configurations of a client, network device, and management server will be described first.

[Configuration of Network Device (Multi-Function Peripheral Device)]

Figure 3:
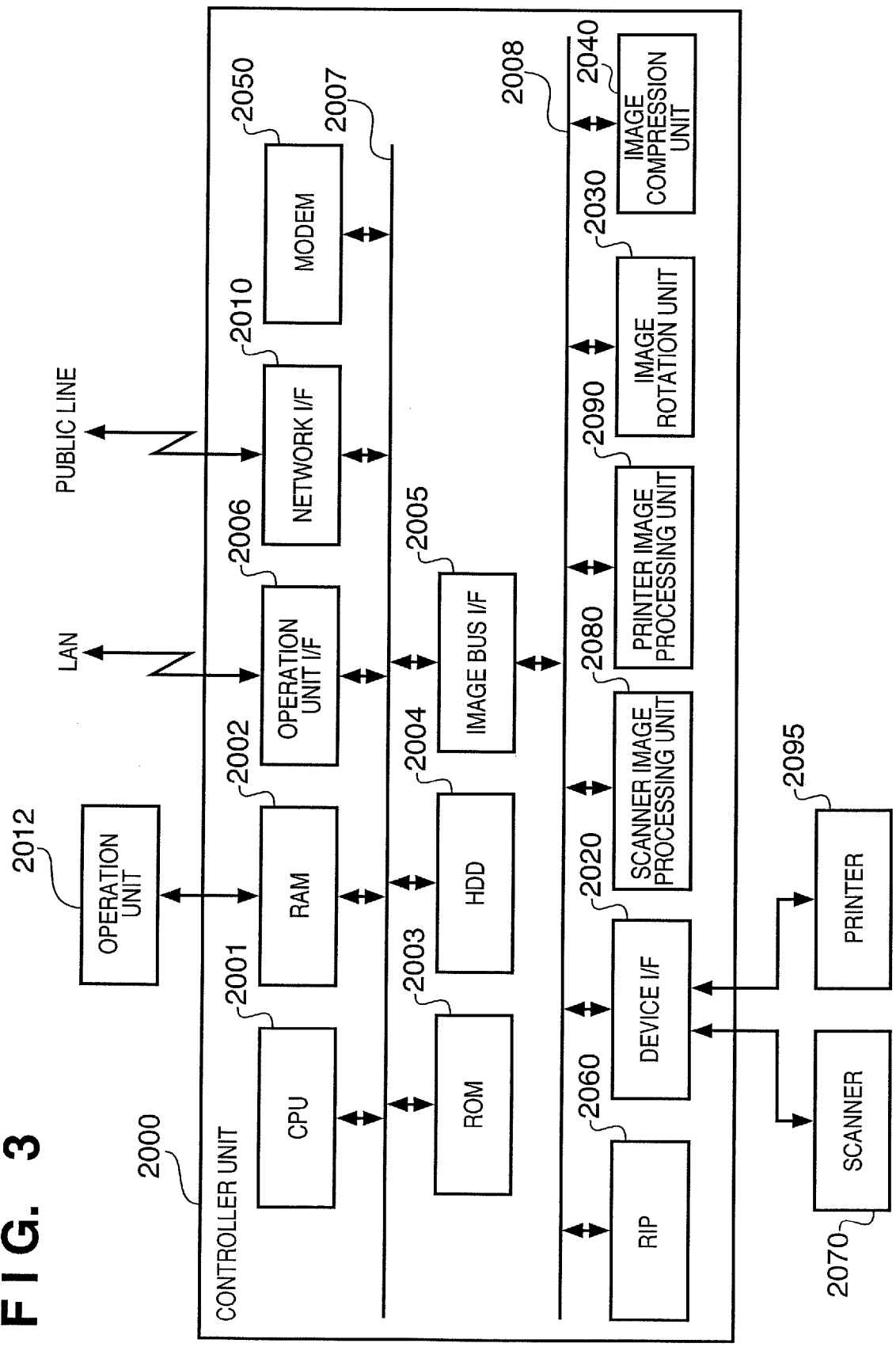
FIG. 3 is a block diagram showing the configuration of a network device in this embodiment.

FIG. 1 shows a plurality of network devices. FIG. 3 is a block diagram showing the configuration of one network device (multi-function peripheral device). The remaining network devices have the same configuration.

A Controller Unit 2000 is mounted as a print board in the apparatus body. The Controller Unit 2000 connects to a scanner 2070 (a device which reads original images) and a printer 2095 as an image output device. The Controller Unit 2000 comprises a network I/F 2010 for connection to the network and a MODEM 2050 for connection to a public line (FAX communication).

A CPU 2001 is a controller which controls the overall network device. A RAM 2002 is a system work memory for the operation of the CPU 2001, and is an image memory for temporarily storing image data. A ROM 2003 stores a boot-program to be executed by the CPU 2001 at the time of power-on and a BIOS for access to the peripheral circuits and apparatuses. An HDD 2004 stores various kinds of pieces of system software (programs) which make this apparatus function as a multi-function peripheral device, and is also used as a buffer which temporarily stores jobs received from the network. When the device receives a plurality of jobs, the device sequentially stores them in the HDD 2004 and forms a queue.

An operation unit I/F 2006 is an interface unit for an operation unit 2012 comprising various kinds of switches, a liquid crystal display device, a touch panel, and the like. The operation unit I/F 2006 transmits information input through the operation unit 2012 to the CPU 2001 and transmits images of various kinds of menus to the operation unit 2012 in accordance with instructions from the CPU 2001.

The above devices are arranged on a system bus 2007.

An Image Bus I/F 2005 is a bus bridge which connects the system bus 2007 to an image bus 2008 which transfers image data at high speed, and converts a data structure. The image bus 2008 comprises a PCI bus or IEEE 1394. The following devices are arranged on the image bus 2008.

A raster image processor (RIP) 2060 converts a PDL code (print data received from the network) into a bitmap image. A device I/F 2020 connects the scanner 2070 or printer 2095 as an image input/output device to the Controller Unit 2000 to perform synchronous/asynchronous conversion of image data. A scanner image processing unit 2080 performs correction, processing, and editing on input image data. A printer image processing unit performs correction, resolution conversion, and the like for the printer on image data to be printed out. An image rotation unit 2030 rotates image data. An image compression unit 2040 performs compression/decompression processing such as JPEG for multilevel image data and JBIG, MMR, or MH for binary image data.

Figure 4:
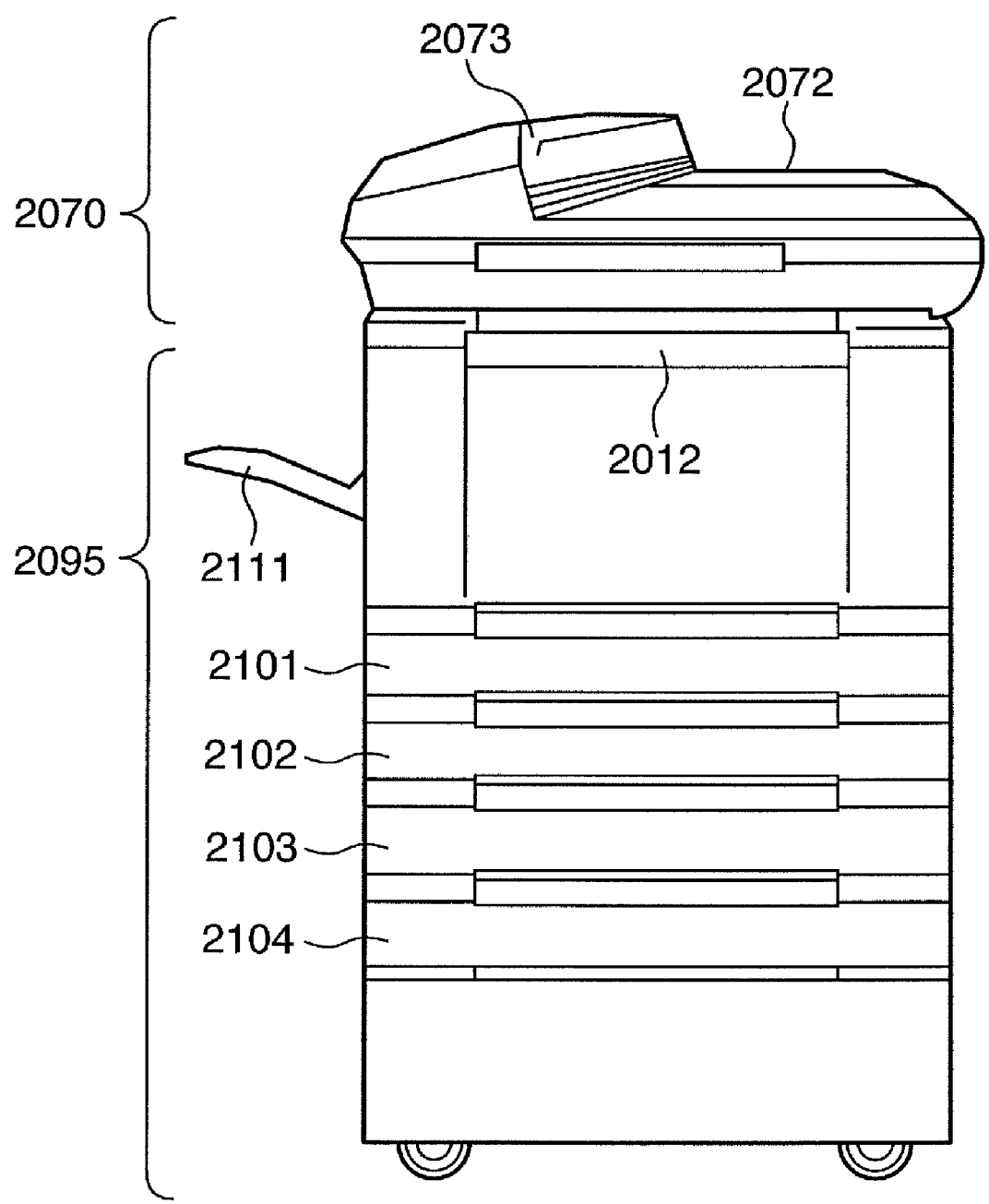
FIG. 4 is an external view of a network device in this embodiment.

FIG. 4 is an external view of a network device. The scanner 2070 as an image input device illuminates an original surface, and reads an image by receiving/scanning the reflected light through a CCD line sensor (not shown). The Controller Unit 2000 stores the read image as raster image data through the device I/F 2020. An original to be read is set on a tray 2073 of a document feeder 2072. When the user issues a read start instruction from the operation unit 2012, the CPU 2001 of the Controller Unit 2000 gives instruction to the scanner 2070. As a consequence, the document feeder 2072 feeds original sheets one by one, and the scanner 2070 reads an original image.

The printer 2095 as an image output device forms electrical raster image data 2096 as a visible image on a paper sheet. Image forming schemes to be used for the above operation include an electrophotographic scheme that uses a photosensitive drum or a photosensitive belt, an inkjet scheme of directly printing images on sheets by discharging ink from a fine nozzle array, and the like. It suffices to use any one of these schemes. Printing operation is started in response to an instruction 2096 from the CPU 2001. The printer 2095 has a plurality of sheet feeding stages so that sheets of different sizes or orientations can be selected, and has paper cassettes 2101, 2102, 2103, and 2104 corresponding to these stages. Moreover, a delivery tray 2111 receives sheets that have been printed.

Figure 5:
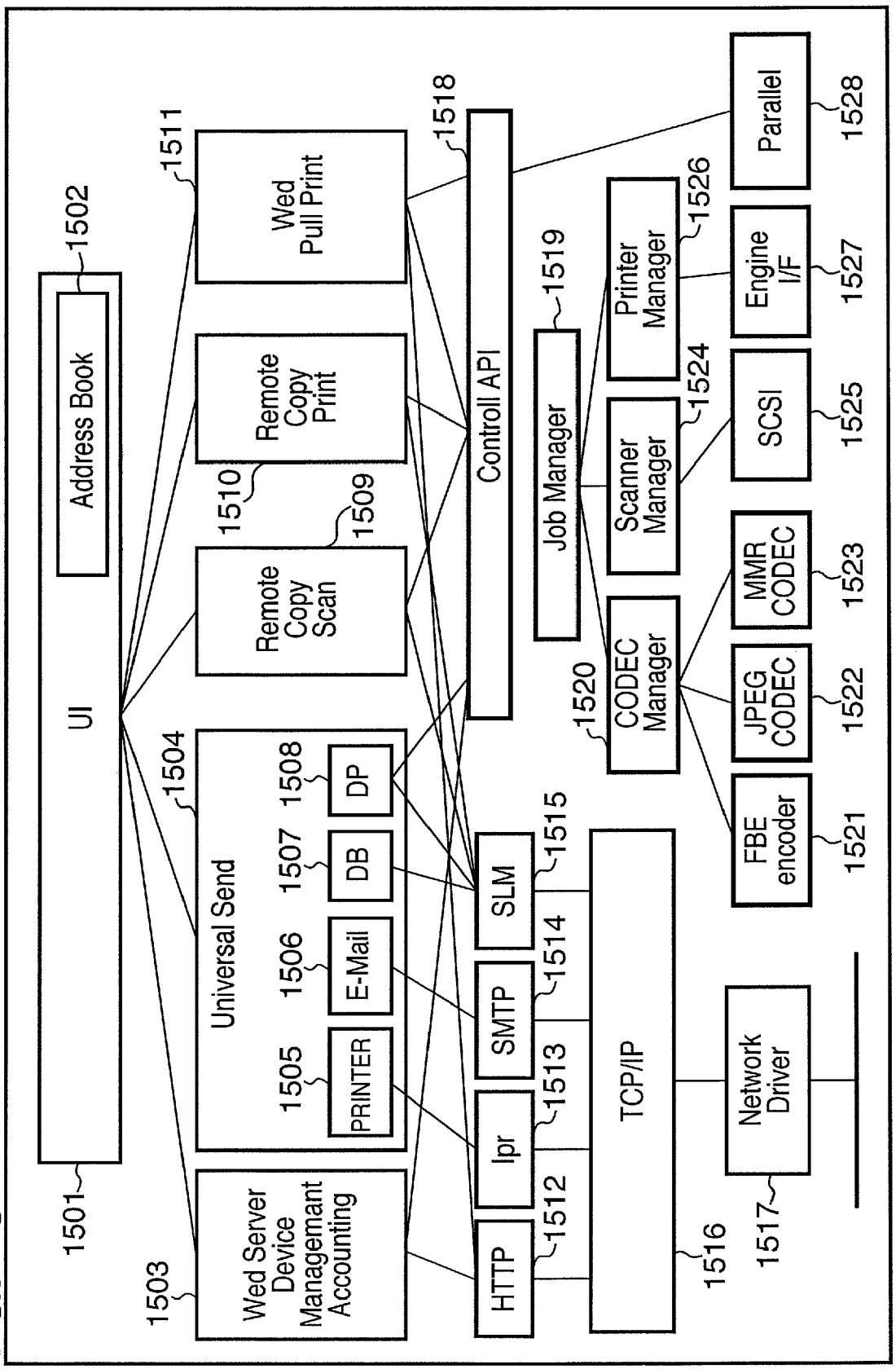
FIG. 5 is a view showing the software configuration of a network device in this embodiment.

FIG. 5 is a view showing the software configuration of a network device. FIG. 5 shows the relationship between various types of software in a case wherein the network device is powered on, and the CPU 2001 loads the respective types of software from the HDD 2004 into the RAM 2002.

Referring to FIG. 5, reference numeral 1501 denotes a module which controls a UI, i.e., user interface, and interfaces the operator with the network device when performing various kinds of operations and settings for the device. This module transfers input information to various types of modules to be described later, issues processing requests, or performs settings and the like for data in accordance with operation by the operator.

Reference numeral 1502 denotes a database module which manages an Address-Book, i.e., the transmission destinations, communication destinations, and the like of data. Data addition, deletion, and acquisition are performed with respect to the contents of the Address-Book in accordance with operation information from the UI 1501, and are used to provide each module to be described later with data transmission/communication destination information in accordance with operation by the operator. This Address-Book stores information such as a data format, the form of an image which can be transmitted, and a resolution in a case wherein the data is to be transmitted to a destination in association with destination information.

Reference numeral 1503 denotes Web-Server module which is used to inform the management information of this image processing apparatus in response to a request from a Web client on the network. The management information is read through a Control-API 1518 and is informed to the Web client through an HTTP module 1512, TCP/IP module 1516, and Network-Driver 1517 which will be described later. A WSD component belongs to this block, and transmits/receives device information by using HTTP/SOAP.

Reference numeral 1504 denotes a Universal-Send module, i.e., a module which controls the delivery of various kinds of data, and distributes data designated by the operator through the UI 1501 to a communication (output) destination designated in the same manner. When the operator issues an instruction to generate distribution data by using the scanner function of this image processing apparatus, the corresponding device is operated through the Control-API 1518 to generate data.

Reference numeral 1505 denotes a printer module which is executed when a printer is designated as an output destination within the Universal-Send module 1504; 1506, an E-mail module which is executed when an E-mail address is designated as a communication destination within the Universal-Send module 1504; and 1507, a database module which is executed when a database is designated as an output destination within the Universal-Send module 1504.

Reference numeral 1508 denotes a DP module which is executed when an apparatus having the same function as this image processing apparatus is designated as an output destination within the Universal-Send module 1504; 1509, a Remote-Copy-Scan module which performs processing equivalent to that by a Copy function implemented by this image processing apparatus alone by using the scanner function of the image processing apparatus upon setting another apparatus connected through a network or the like as an output destination; and 1510, a Remove-Copy-Print module which performs processing equivalent to that by the Copy function implemented by this image processing apparatus alone by using the printer function of the image processing apparatus upon setting another apparatus connected through a network or the like as an input destination.

Reference numeral 1511 denotes a Web-Pull-Print module, i.e., a module which reads out and prints information on various kinds of home pages on the Internet or an intranet; 1512, a module to be used when this image processing apparatus performs communication by HTTP, and provides the Web-Server module 1503 and Web-Pull-Print module 1511 described above with communication by using the TCP/IP module 1516; and 1513, an Ipr module which provides the printer module 1505 in the Universal-Send module 1504 with Ipr communication by using the TCP/IP module 1516 to be described later.

Reference numeral 1514 denotes an SMTP module which provides the E-mail module 1506 in the Universal-Send module 1504 described above with SMTP communication by using the TCP/IP module 1516 to be described later.

Reference numeral 1515 denotes a Salutation-Manager module. The SCM 1515 provides the database module 1507 and DP module 1508 in the Universal-Send module 1504, the Remote-Copy-Scan module 1509, and the Remove-Copy-Print module 1510 with communication based on the salutation architecture by using the TCP/IP module 1516 to be described later.

The TCP/IP communication module 1516 provides the respective modules described above with network communication complying with TCP/IP by using a Network-Driver to be described later. Reference numeral 1517 denotes a Network-Driver which controls a portion physically connected to the network; and 1518, a Control-API which provides upstream modules such as the Universal-Send module 1504 with an interface with downstream modules such as a Job-Manager 1519 to be described later, thereby reducing the dependency relation between upstream and downstream modules and improving their diversity.

Reference numeral 1519 denotes a Job-Manager which analyzes the processing contents designated by the respective modules described above through the Control-API 1518 and issues instructions to the respective modules to be described later. This module manages hardware processes executed in this image processing apparatus in a unified manner.

Reference numeral 1520 denotes a CODEC-Manager which manages/controls various types of compression/decompression of data in processing designated by the Job-Manager 1519.

Reference numeral 1521 denotes an FBE-Encoder which compresses data read by scan processing executed by the Job-Manager 1519 and a Scan-Manager 1524 according to the FBE format; 1522, a JPEG-CODEC which performs JPEG compression of read data and JPEG decompression of print data in read/scan processing executed by the Scan-Manager 1524 and print processing executed by a Print-Manager 1526; and 1523, an MMR-CODEC which performs MMR compression of read data and MMR decompression processing of print data in read/scan processing executed by the Scan-Manager 1524 and print processing executed by the Print-Manager 1526.

The Scan-Manager 1524 manages/controls read/scan processing designated by the Job-Manager 1519. A SCSI driver 1525 performs communication between the Scan-Manager 1524 and the scanner internally connected to this image processing apparatus.

The Print-Manager 1526 manages/controls print processing designated by the Job-Manager 1519. An Engine-IF driver 1527 provides an I/F between the Print-Manager 1526 and the printing unit.

Reference numeral 1528 denotes a parallel port driver which provides an I/F in a case wherein the Web-Pull-Print module 1511 outputs data to an output device (not shown) through a parallel port.

Note that only those of the above modules which are necessary for an apparatus to be used can be set and used.

[Configuration of Client (PC)]

Figure 6:
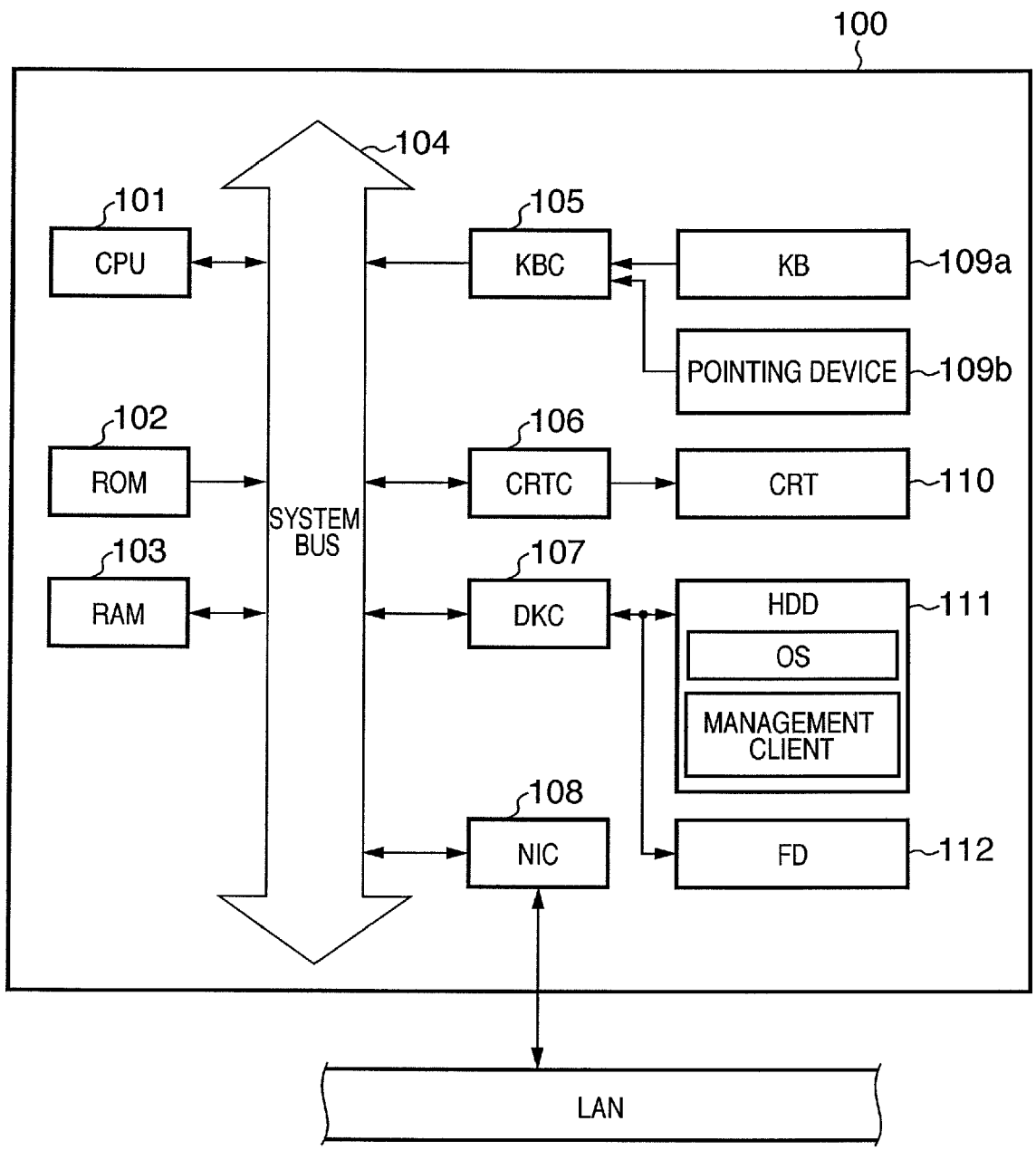
FIG. 6 is a block diagram showing the configuration of a client in this embodiment.

FIG. 1 shows a plurality of clients. FIG. 6 is a block diagram showing the configuration of one of the clients. Assume that the remaining clients have the same configuration.

Referring to FIG. 6, reference numeral 101 denotes a CPU which controls the overall client terminal 100; 102, a ROM storing a BIOS and a bootprogram; 103, a RAM which is used as a work area for the CPU 101 and in which an OS, various kinds of drivers, and applications are loaded to be executed; 104, a system bus; 105, a keyboard controller which connects a keyboard 109a and a pointing device 109b such as a mouse; 106, a CRT controller (CRTC) 106 which incorporates a video memory and a video controller which performs drawing processing with respect to the video memory and outputs a read video signal from the video memory to the outside (CRT 110); and 107, a device controller which controls access to an HDD (Hard Disk Drive) 111 and an FDD (Flexible Disk Drive). The HDD 111 stores an OS (Operating System) and a management client application program in this embodiment. Note that in addition to the above software, the HDD 111 stores a document editing application and files created by various applications. Reference numeral 108 denotes a NIC (Network Interface Card) which is used to connect this client apparatus to the network.

In the above configuration, when the power supply of the client is turned on, the CPU 101 executes a program in the ROM 102 and loads the OS from the HDD 111 into the RAM 103 to function as a client connected to the network. In this case, a management program (to be described in detail later) is also loaded into the RAM 103 and is made resident in the RAM 103. Thereafter, the user activates various applications as needed to perform processing such as editing and printing.

[Configuration of Management Server 500]

FIG. 7 is a block diagram showing the configuration of the management server 500 in this embodiment. The management server 500 basically comprises a PC like the client terminal 100, and hence has substantially the same hardware configuration as that shown in FIG. 6. Referring to FIG. 7, reference numerals 501 to 512 correspond to reference numerals 101 to 112 in FIG. 6. The management server 500 executes the OS to function as a server and a management server program 550 for managing clients and network devices on the network. The OS and the management server program 550 are stored in the HDD 511. When the power supply of the apparatus is turned on, these programs are loaded into a RAM 502 to be executed. A database 560 in the HDD 511 is a database (DB) group to be accessed during the execution of the management server program 550.

Figure 8:
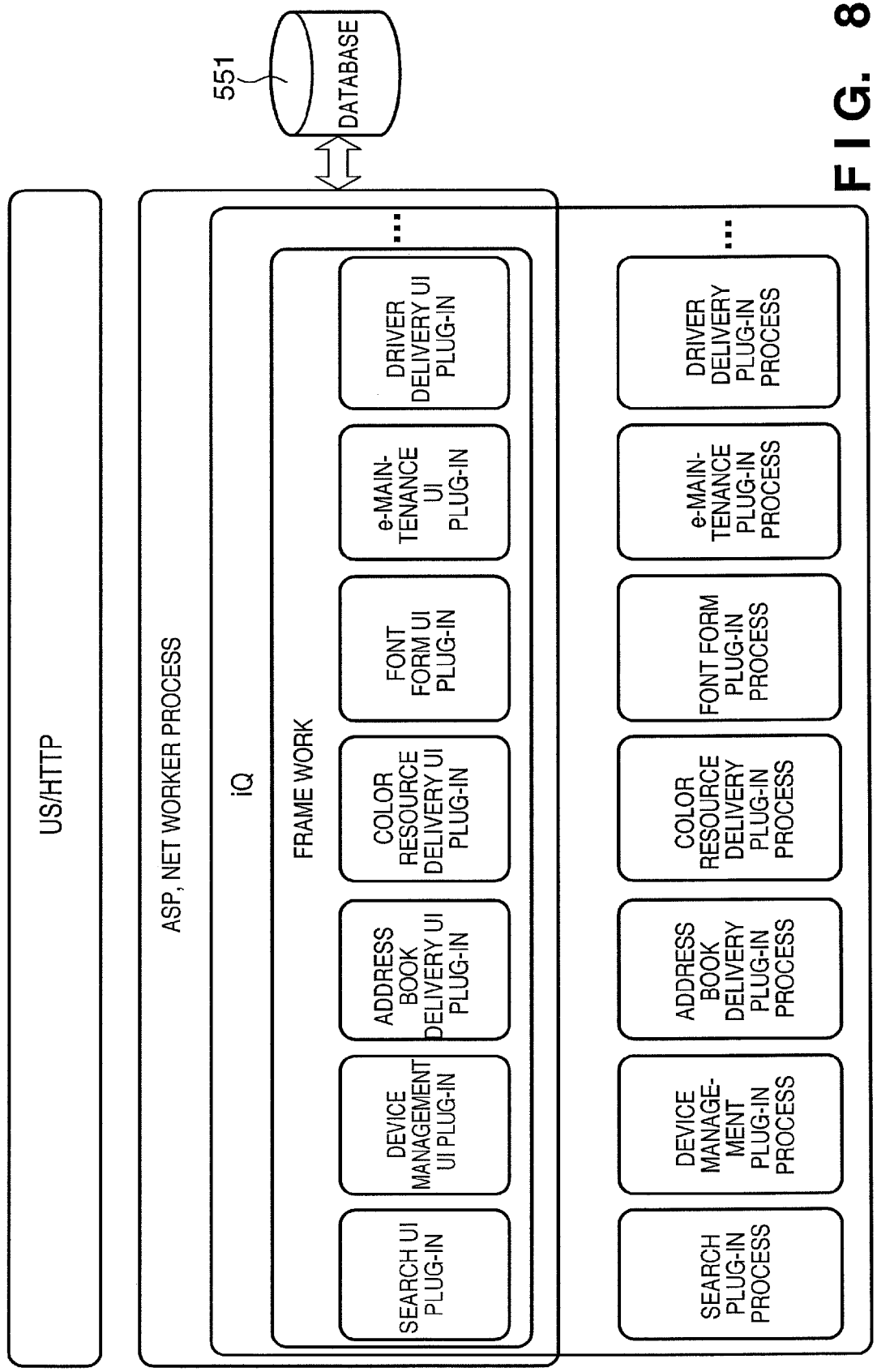
FIG. 8 is a view showing the software configuration of the management server in this embodiment.

FIG. 8 is a view showing the configuration of the modules of software during the execution of the management server program 550 in the management server 500. The management server program 550 comprises a UI plug-in having a plurality of Web UIs and a plug-in process as a logic portion.

A device search plug-in searches for a device on the network. The search plug-in receives a Hello message defined by WSD and transmits/receives Metadata. The information of a device which is plugged and played is stored in the database and notified to other plug-ins. A device management plug-in is a plug-in which acquires and sets the network information of a device and device information. An address book delivery plug-in is a plug-in which manages and delivers an address book having FAX destination information. A color resource delivery plug-in is a plug-in which manages and delivers a color profile to be downloaded to a device. A font form delivery plug-in is a plug-in which manages and delivers a font form to be downloaded to a device. An E-maintenance plug-in is a plug-in which performs an e-maintenance service. This plug-in acquires the log of consumable item information from the device and transmits the information to a sales company. The sales company performs a maintenance service on the basis of the information. A driver delivery plug-in is a plug-in which delivers a driver to a client.

This device management software manages a plurality of devices upon registering them in a device group to make device settings and the like for the plurality of devices altogether. This software manages clients in the same manner and manages a plurality of clients by forming a client group. These pieces of device group information and client group information are stored in a database 551. In addition, the resource management numbers of the devices are also stored in the database.

The network devices, clients, and management server in the above embodiment have been described. An example of network processing in this embodiment will be described next.

<Explanation of Management Server>

[Explanation of Grouping]

The management server 500 in this embodiment manages the respective clients on the network and the respective network devices such that they belong to some groups, as described with reference to FIG. 1. This grouping operation will be described first.

Figure 9:
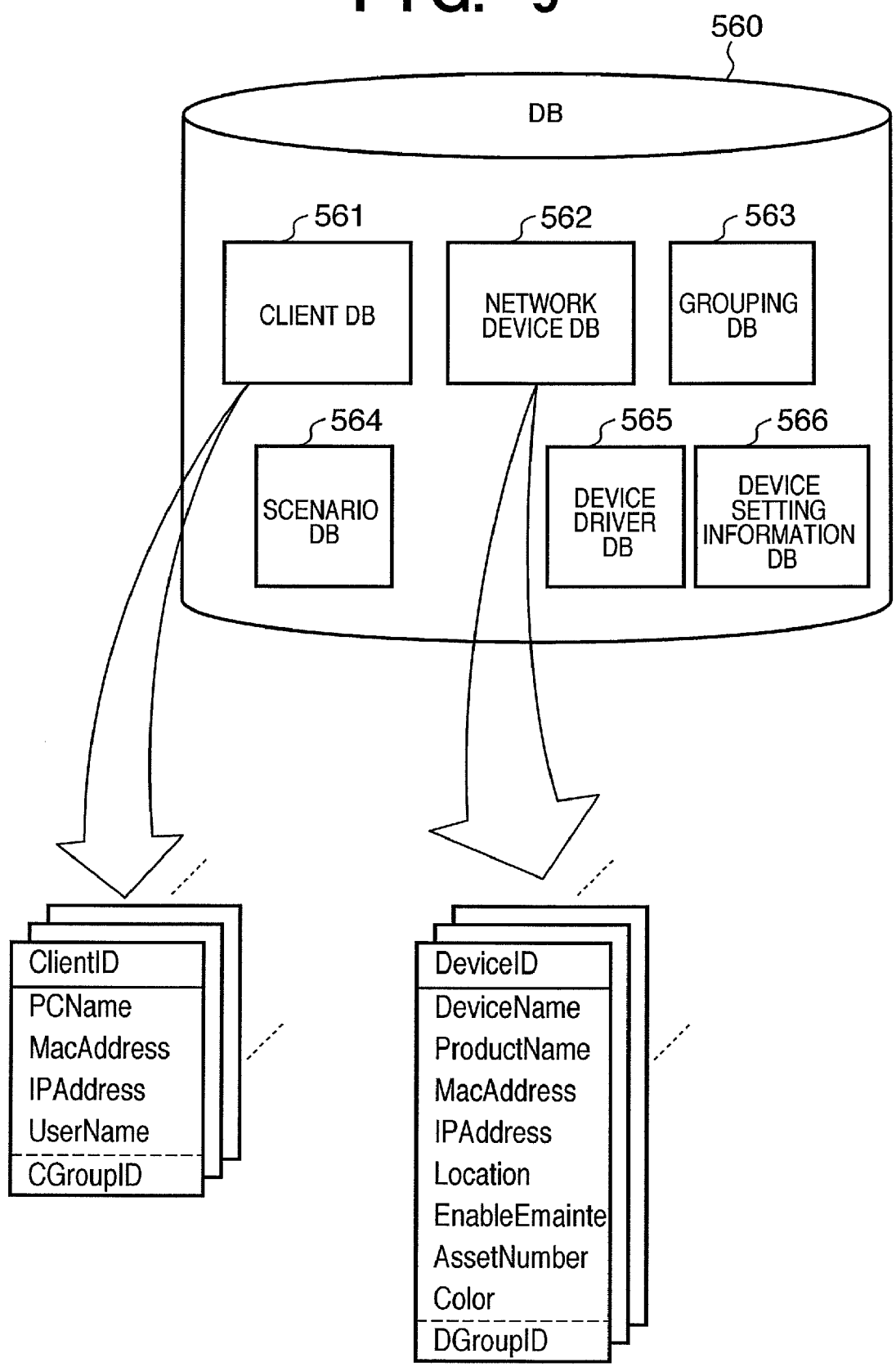
FIG. 9 is a view showing the types of databases managed by the management server in this embodiment.

FIG. 9 shows the structure of the DB 560 of the management server 500 according to this embodiment. The DE 560 includes a client DB 561, network device DB 562, grouping DB 563, scenario DB 564, device driver DB 565, and device setting information DB 566.

Of these components, the device driver DB 565 is a database which stores device drivers (a printer driver and the like) required when the respective clients use network devices, and hence a detailed description thereof is unnecessary. Note that the maker of each network device upgrades the device driver as needed. The IT administrator therefore downloads the latest version of a device driver from a corresponding site at a proper timing, and stores it in the device driver DB 565 in correspondence with the network device.

The device setting information DB 566 has the following configuration.

As described above, a network device in this embodiment is a multi-function peripheral device, which can additionally have a function corresponding to an option board (card) by mounting it. A typical example is a FAX board. Upon adding a FAX board, a client which uses the network device which has mounted the board therein is installed with a driver for FAX transmission using the FAX board. Within the same department, clients often use the same address book. Therefore, this address book is prepared for a target client group and is downloaded and registered in a corresponding network device, as needed. The device setting information DB 566 stores information for setting specific information with respect to such a network device for each client group. Although the case wherein the option board is added has been described above, a department mainly engaged in product design demands that print colors be those intended. It is therefore necessary to make a network device used by such a client group download a color profile. The device setting information DB 566 includes such a color profile.

The client DB 561 is a database which manages clients (PCs) existing on the network. The management server 500 internally manages identification numbers, i.e., ClientID numbers, unique to the respective clients so as to specify them. Information about each client is provided with fields for the name (PCName) of the client terminal on the network, the MAC address (Media Access Control Address; MacAddress) of a network card, an IP address (IPAdress), and the log-in name of a user who logs in to the network. This information is also provided with a field for information (CGgroupID) indicating to which client group the client belongs. When a client is newly registered, CGgrouID is blank (null). If, however, the IT administrator operates to perform setting so as to make such a client belong to a proper client group, information specifying the client group is stored in this CGgroupIP.

The network device DB 562 is a database which manages network devices existing on the network. The respective network devices, like the clients, are managed with unique identification numbers, i.e., DeviceID numbers, to specify the respective devices. Information about each network device includes fields for a name (DeviceName), e.g., "a printer beside Mr. Tanaka in the general affairs department", which facilitates identification of the device, the product name (ProductName) of the network device, a MAC address (MacAddress), an IP address (IPAddress), the location information of the device (Location; a character string such as information indicating a floor number, room number, or department), information (EnableEmainte) indicating whether the device is subjected to e-maintenance, an asset management number (AssetNumber), and information (Color) indicating whether print colors are full-color or monochrome. This information also includes a field for information (DGroupID) indicating to which device group the device belongs. When a network device is newly registered, DGgrouID is blank (null). If, however, the IT administrator operates to perform setting so as to make such a client belong to a proper client group, information specifying the client group is stored in this DGgroupIP.

When a client is newly installed in the network, the IT administrator operates the management server 500 to key-input information to be input to each field described above and register it in the client DB 561. When a network device is to be newly registered, the corresponding information is registered in the network device DB 562 in the same manner.

The grouping DB 563 will be described next.

Figure 10:
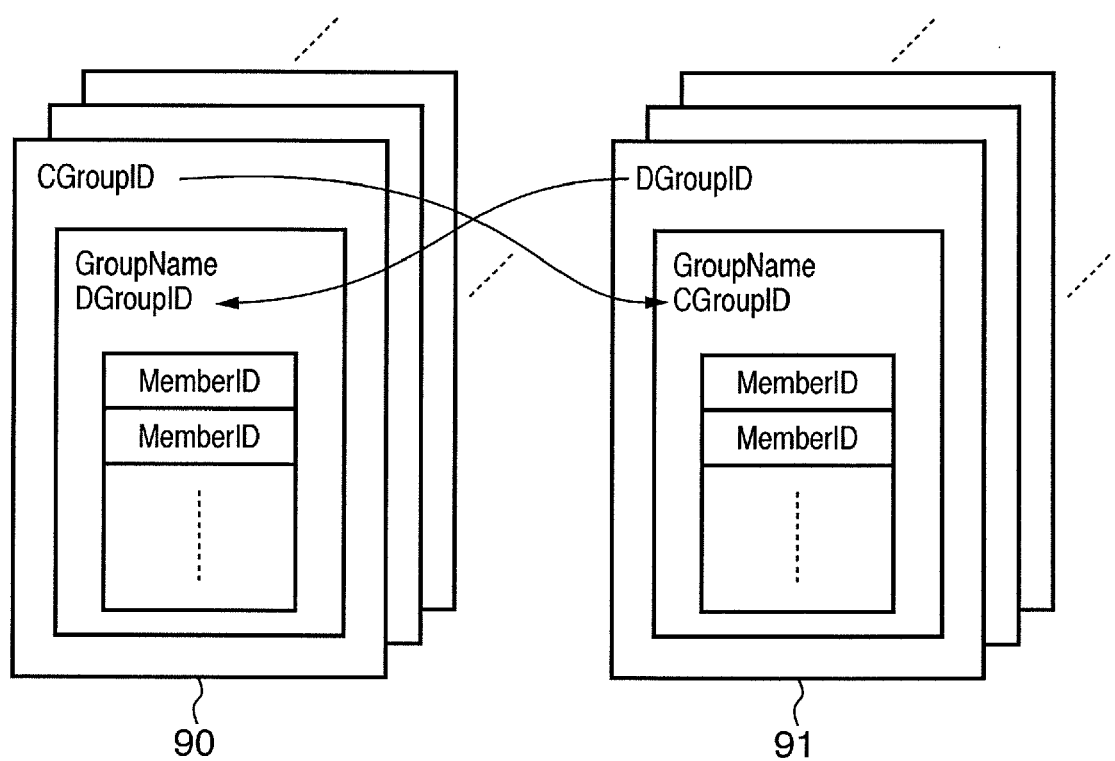
FIG. 10 is a view for explaining the data structures of client groups and device groups and association therebetween in this embodiment.

FIG. 10 shows the structure of a grouping DB. The grouping DB 563 comprises two DBs, i.e., a client group DB 90 and a device group DB 91. One client group is managed by client group identification information (CGgroupID) for uniquely specifying the client group. In addition, one device group is managed by device group identification information (DGgroupID) for uniquely specifying the device group.

Each group has a group name (GroupName) for allowing the IT administrator to easily identify the group. This group name can be written in a hierarchical structure with a delimiter (delimiter character "¥"), e.g., "patent department¥first patent section" or "7F¥room 710". This makes it possible to efficiently manage many departments and rooms as in an enterprise or the like.

Client groups and device groups are associated with each other by making them mutually store the pieces of group identification information (DGgroupID, CGgroupID) of the respective groups.

The respective pieces of client identification information (Client IDs; see the client DB) belonging to client groups are stored in MemberID1, MemberID2, . . . , shown in FIG. 10. This makes it possible to also specify clients belonging to the client group from the client group DB. This also applies to device groups.

Note that when a client group (or a device group) is newly created, since any device group to be associated with the group is unknown, the IT administrator performs associating operation.

Figure 11:
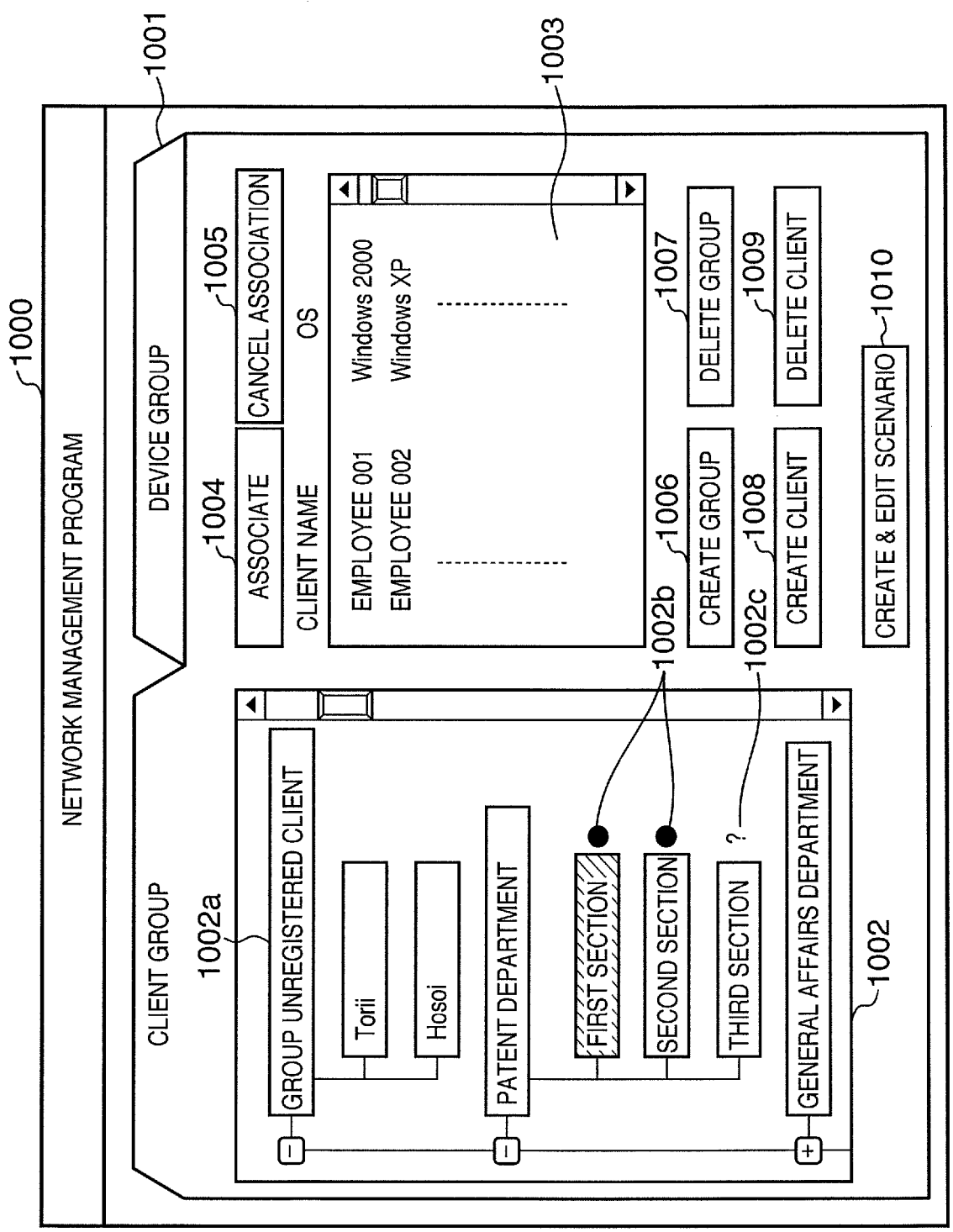
FIG. 11 is a view showing an example of a GUI in the management server in this embodiment.
Figure 12:
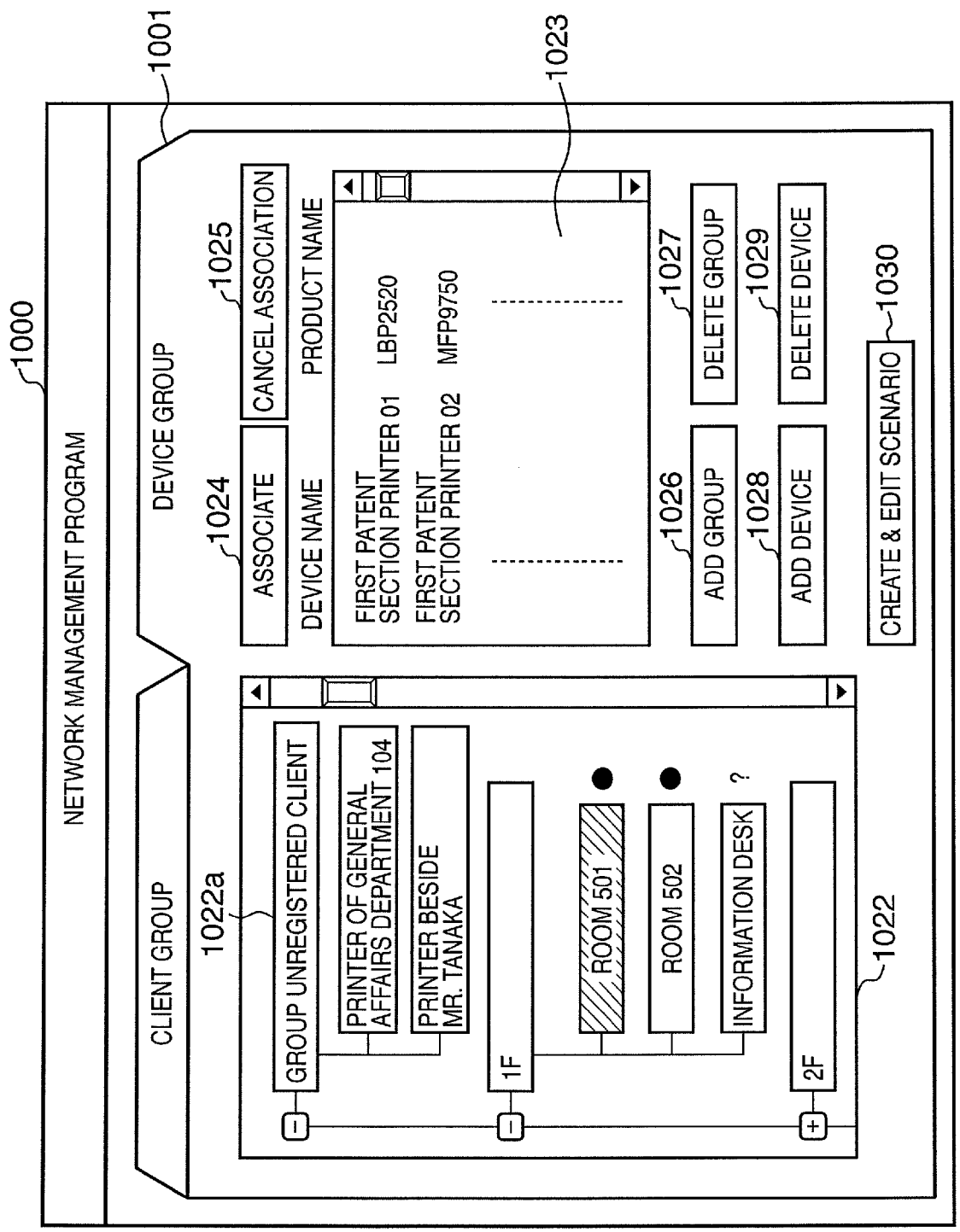
FIG. 12 is a view showing an example of a GUI in the management server in this embodiment.

FIGS. 11 and 12 show a setting window 1000 of the management server program 550 in the management server 500 in this embodiment.

The setting window 1000 is in a tab form as shown in FIGS. 11 and 12 to allow various kinds of settings associated with both a client group and a device group. FIG. 11 shows a state wherein the tab "client group" is active. FIG. 12 shows a state wherein the tab "device group" is active. The operator activates one of these tabs by moving a cursor displayed in synchronism with the operation of a pointing device to the corresponding tab and operating a switch provided on the pointing device. This series of operations will be simply referred to as clicking hereinafter. Reference numerals 1022 to 1030 in FIG. 12 denote substantially the same functions as those denoted by reference numerals 1002 to 1010 in FIG. 11. FIG. 11 shows a tab screen associated with clients, and each button is a processing button for a client or client group. In contrast to this, FIG. 12 is a tab screen associated with devices, and each button is a processing button for a device or device group. The following will be described with reference to the tab screen for the client group in FIG. 11. For a device group, read "client" and "device", which will be described below, as "device" and "client", respectively.

Reference numeral 1002 denotes a client group display area on which a list of client groups is displayed. In this area, as described above, the group name (GroupName; see FIG. 10) of a group DB is displayed in a hierarchical structure with the delimiter "¥".

Referring to FIG. 11, the symbol "−" on the left side of "patent department" indicates that all the layers immediately below "patent department" are open. The symbol "−" also indicates that when the cursor displayed in synchronism with the operation of the pointing device is moved to this symbol position and the button provided on the pointing device is pressed, the display of the layers immediately below the symbol position is stopped. The symbol "+" on the left side of "general affairs department" indicates that there are layers immediately below "general affairs department", and also indicates that when the symbol is clicked, the layers immediately below the symbol position are displayed.

Clients which do not belong to any group are arranged on the layer of "group unregistered client" 1002a.

A mark 1002b indicates that a device group has already been associated with the corresponding client group. This case corresponds to the case wherein device group identification information is stored in the field "DGgroupID" in the client group data in FIG. 9. A mark 1002c indicates that no device group has been associated with the corresponding client group. This case corresponds to a case wherein a client group is newly created, and also corresponds to a case wherein the association with a device group is canceled.

Note that "patent department¥first patent section" in the client group display area 1002 is highlighted to indicate that this field is currently selected. This selection is performed by clicking the corresponding group name.

Reference numeral 1003 denotes a client display area on which a list of clients belong to a selected group (group name "patent department¥first patent section" in the case shown in FIG. 11) is displayed.

Reference numeral 1004 denotes an association button for associating a device group with a selected client group. Note that if a selected client group has already been associated with a device group, the association button 1004 does not function.

Figure 13:
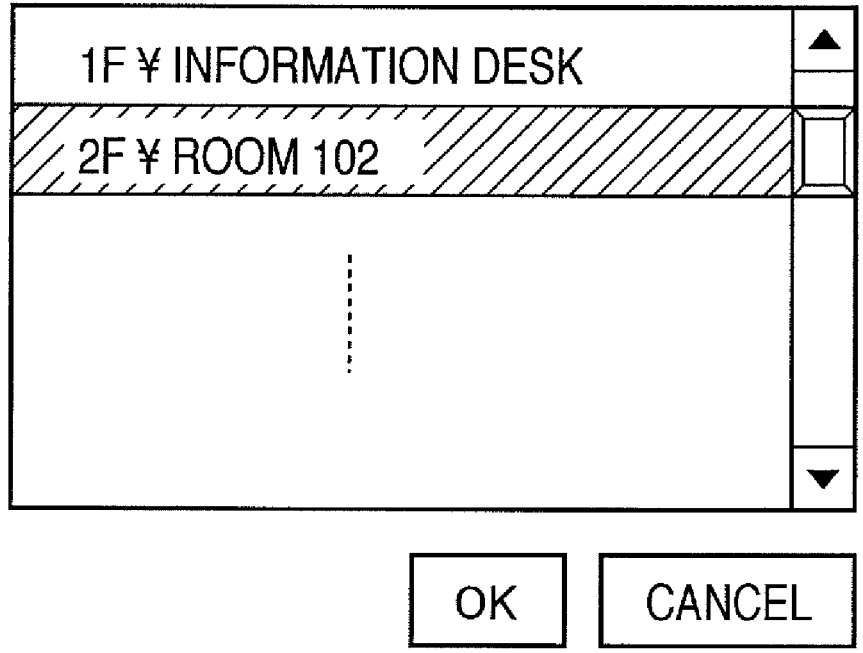
FIG. 13 is a view showing a GUI for setting association between client groups and device groups in this embodiment.

For example, referring to FIG. 11, when the client group "patent department third patent section" is selected and the association button 1004 is clicked, a window like that shown in FIG. 13 is displayed. The IT administrator selects one of device groups which are not associated with any client groups, and clicks the OK button to associate the client group with the device group. In the case in FIG. 13, since the device group "2F¥room 102T" is selected, the client group "patent department¥third patent section" and the device group "2F¥room 1021" are associated with each other.

Reference numeral 1005 denotes an association cancellation button for issuing an instruction to cancel the association of a device group with a selected client group. If a selected client group has not been associated, the association cancellation button 1005 does not function.

Reference numeral 1006 denotes a button for issuing an instruction to newly create a client group. When the client creation button 1006 is clicked, a registration window (not shown) for inputting information in each field of the client group shown in FIG. 9 is displayed. The operator then issues a registration instruction in this registration window to register a client group. As a result, the client group display area 1002 is also updated.

Reference numeral 1007 denotes a button for deleting a client group. When the operator clicks the group deletion button 1007, the selected client group is deleted. If there is a device group associated with the client group, the association of the device group is also canceled.

Reference numeral 1008 denotes a button for newly creating a client. When the operator clicks the client creation button 1008, a window for newly registering a client in the client DB (see FIG. 9) is displayed. The IT administrator key-inputs information in necessary items to register the client.

Reference numeral 1009 denotes a button for issuing an instruction to delete a client. When the operator clicks the deletion button 1009 while a desired client in the client display window 1003 is selected or a desired client in "group unregistered client" displayed in the client group display area 1002 is selected, the corresponding client is deleted from the client DB.

Reference numeral 1010 denotes a button for creating and editing a scenario associated with the installation of a device driver stored in the device driver DB 565 with respect to a selected client group. A scenario creation & editing button 1030 on the device group tab screen in FIG. 12 is a button for creating and editing a scenario associated with downloading of information in the device setting information DB with respect to a network device group. Pieces of scenario information set by the buttons 1010 and 1030 are stored and managed in the scenario DB 564. A detailed description of this operation will be described in detail later.

When adding a client which belongs to no group to a desired client group, the IT administrator performs dragging operation. This dragging operation is to move the cursor to the position of a target item, move the cursor to another desired position while pressing the switch (or button) on the pointing device, and release the switch of the pointing device after the movement of the cursor to the desired position.

In the case shown in FIG. 11, after selecting a client group, the operator drags a desired client name in "group unregistered client" into the client terminal 100. As a result, the selected client is registered as a member of the selected client group. On the contrary, dragging a client displayed in the window 1003 to the position of "group unregistered client" makes it possible to delete the client from the corresponding client group. In addition, similar dragging operation can move a client belonging to a given client group to another group.

The client group tab screen has been described above. An operation method on the device group tab screen in FIG. 12 is substantially the same as that in FIG. 11, and hence a detailed description thereof will be omitted.

Figure 14:
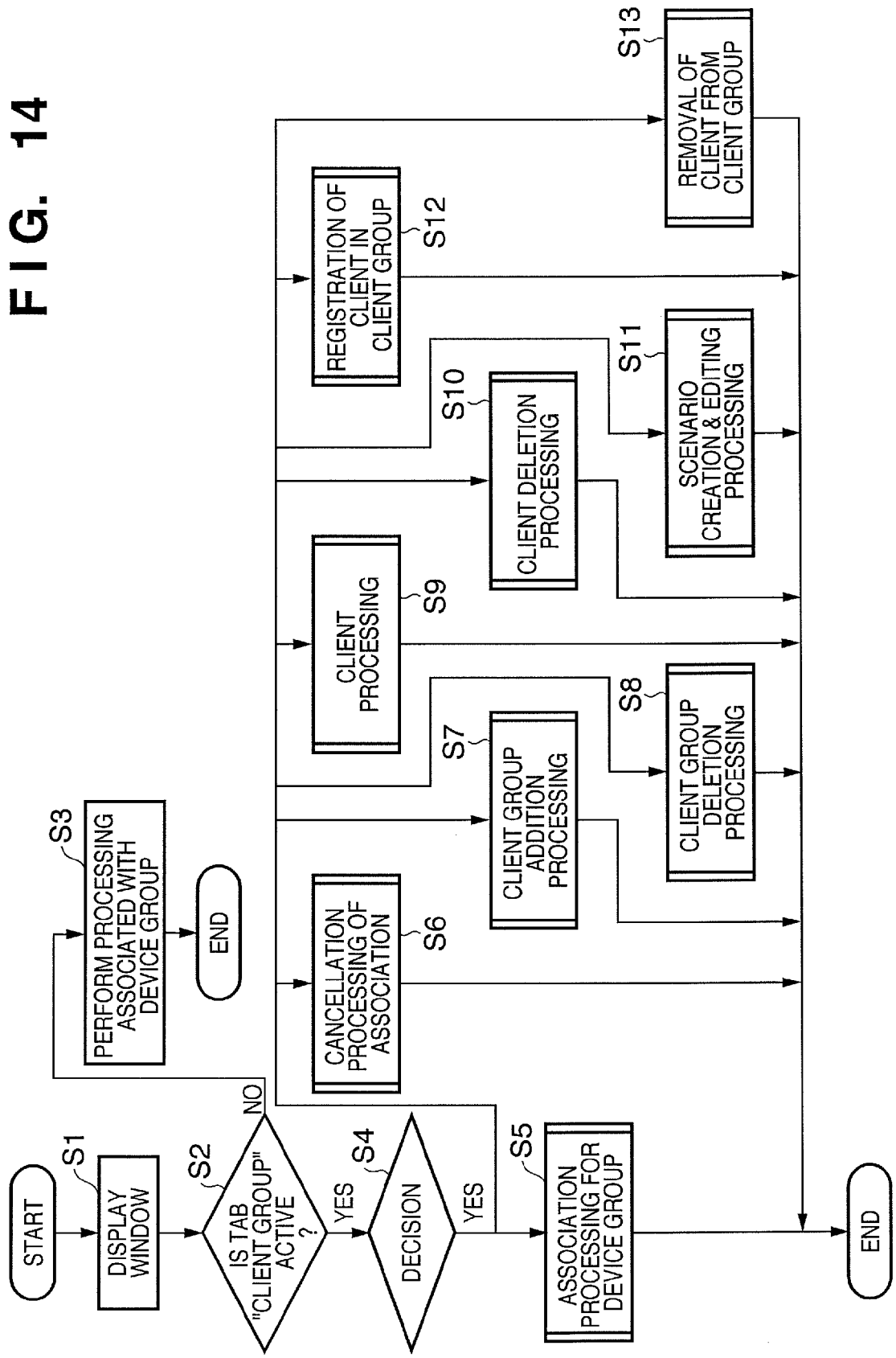
FIG. 14 is a flowchart showing a processing procedure associated with setting operation by the management server in this embodiment.

Processing associated with the GUI of the management server 500 is performed with reference to the flowchart of FIG. 14. This processing is executed by a CPU 501 of the management server 500.

When the IT administrator gives an instruction to activate a setting application as one of the applications of the management server program 550, the window in FIG. 11 or 12 is displayed in step S1. In step S2, it is determined whether the tab "client group" or the tab "device group" is active. If it is determined that the tab "client group" is active, the process advances to step S4 to perform determination about an instruction input from the IT administrator. As a result, one of the processes in steps S5 to S13 is executed. Since these processes are obvious from the above description, a description thereof will be omitted.

If it is determined in step S2 that the tab "client group" is inactive, i.e., the tab "device group" is active, the process advances to step S3. The processing in step S3 is the same as that in steps S4 to S13 except that the processing target is a device or device group, and hence a detailed description thereof will also be omitted.

<Explanation of Driver Setup of Client Group>

The processing up to the point where a device driver corresponding to a client group is installed or setting information for a specific network device in a device group is downloaded in this embodiment will be described next.

When the power supply of a network device (a printer or multi-function peripheral device in this case) is turned on, the network device broadcasts a Hello message indicating entry to the network. A program for monitoring the reception of a message from the network is resident in each client on the network. The client performs the processing of responding to only a message from the management server 500 by using the program. In other words, upon receiving a Hello message or the like from a unit other than the management server 500, the device discards the message without transferring it to the OS (blocking communication to the OS). When newly connecting a client to the network, therefore, the administrator performs operation such as installing the corresponding program. In consideration of this point, driver setup in this embodiment will be described.

Figure 15:
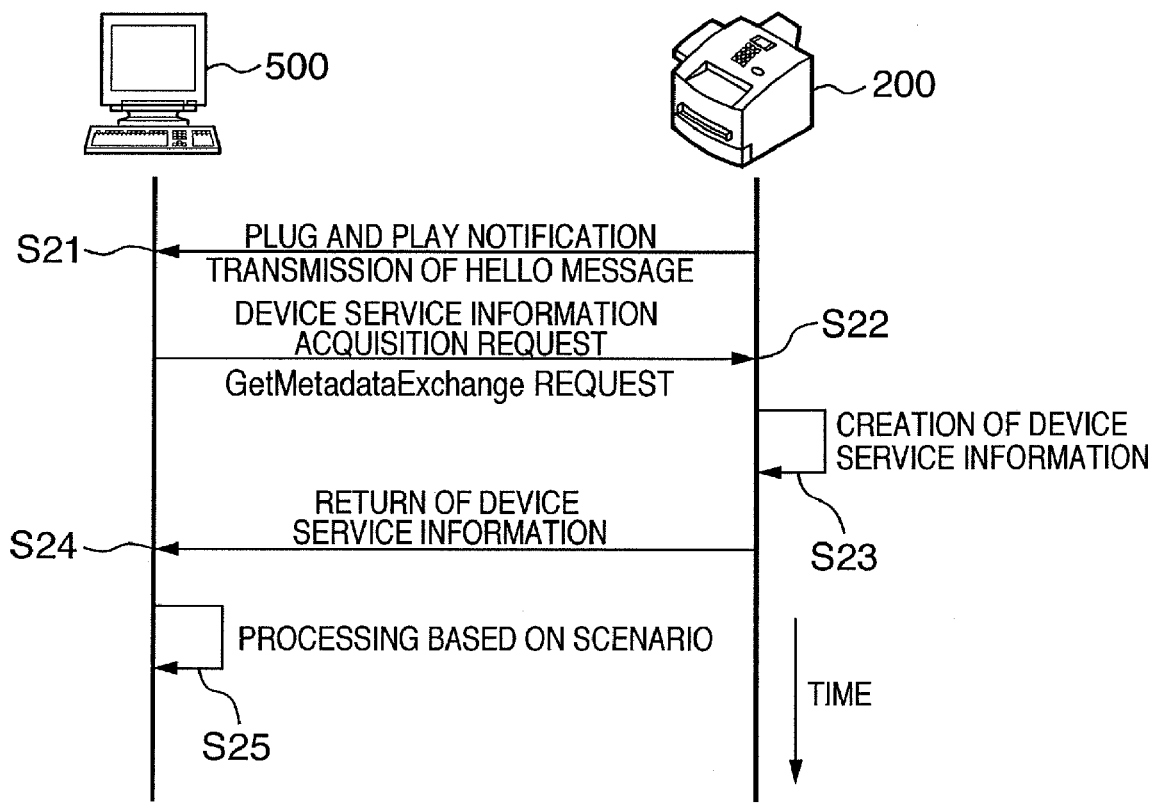
FIG. 15 is a view showing a sequence for communication between network devices and the management server in this embodiment.

FIG. 15 shows a communication procedure between the management server 500 and the network device 200 in this embodiment.

When the power supply of the network device 200 is turned on, a Hello message is broadcast from the network, and hence the management server 500 receives it (step S21). The management server 500 can know the IP address of the issuing source of the Hello message. The management server 500 therefore unicasts a device service information acquisition message (GetMetadata message) to the network device 200 of the IP address, and the network device 200 receives it (step S22).

The network device 200 can know the request source (management server 500) from the IP address of this request message. The device then creates information as a response to the request (step S23), and unicasts the information as device service information to the management server 500 (step S24).

With the above processing, the management server 500 can know the IP address of the network device which has issued Hello message and the configuration of the network device (e.g., whether an option board (FAX board or the like) has been newly added).

The management server 500 therefore searches the network device DB 562 to know to which device group the network device which has issued the Hello message belongs, and specifies the associated client group. The management server 500 then transmits a driver install request message to each client as a member of the specified client group. In addition, when a feature expansion board (FAX board) is newly mounted in the network device 200, a device driver install request is issued in accordance with the feature expansion. In some case, when a network device mounts a FAX board or the like, or a network device is a newly purchased color multi-function peripheral device, an address book for FAX transmission and a color profile for color matching are downloaded in the device.

The timing of issuing the above driver install request message or downloading of information into a network device complies with the scenario set for the corresponding client group or device group. Step S25 in FIG. 15 indicates this processing.

Figure 16:
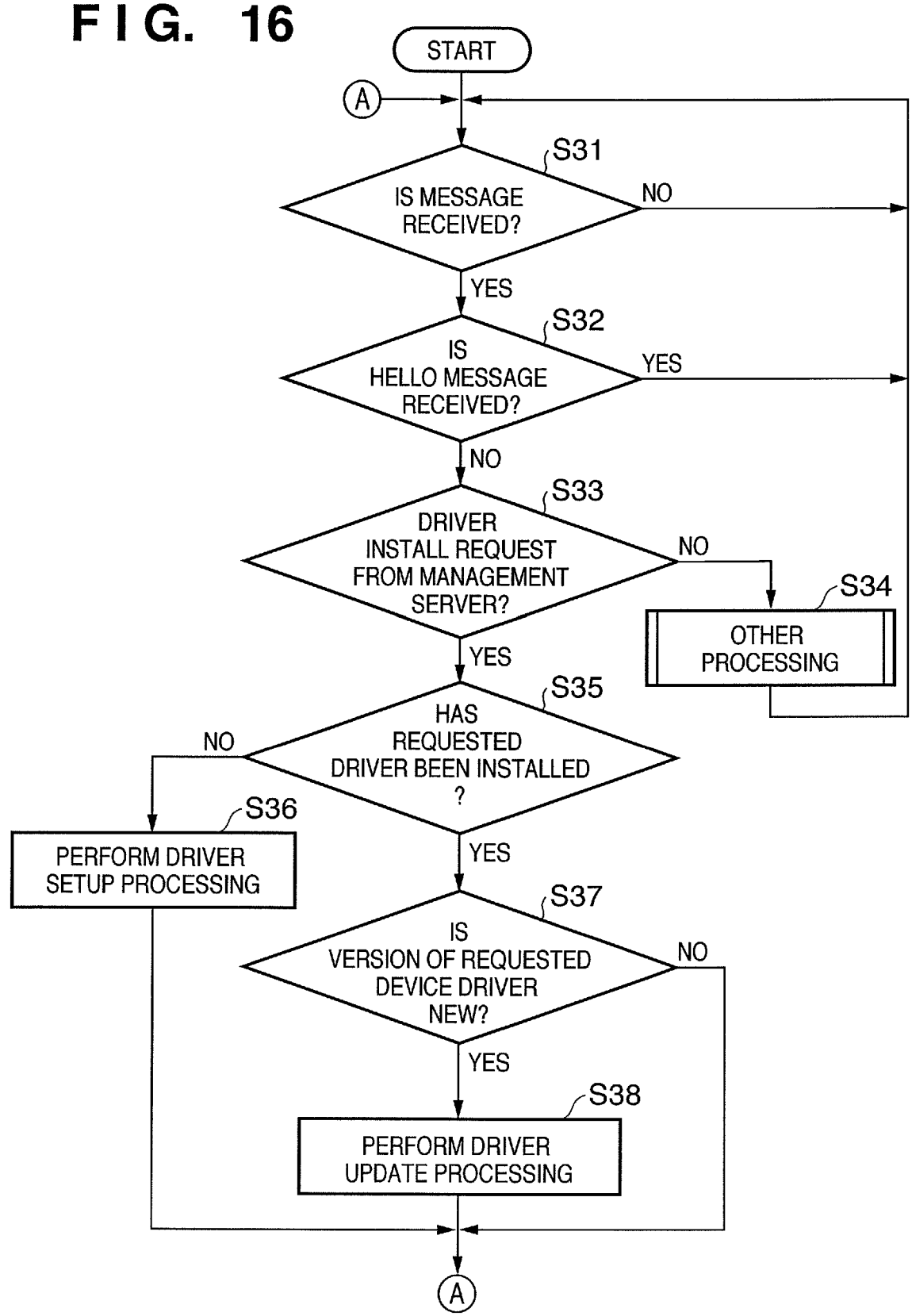
FIG. 16 is a flowchart showing a processing procedure executed by a client in this embodiment.

Processing by each client in this embodiment will be described with reference to the flowchart of FIG. 16. A program corresponding to the flowchart of FIG. 16 is a program for monitoring the reception of a message from the network. This program also serves as a program which is resident in the memory (RAM) when the OS is activated.

In step S31, it is determined whether any information has been received from the network. If NO in step S31, the process does not advance to the next step.

If it is determined that some information has been received from the network, the process advances to step S32 to determine whether the received information is a Hello message from a network device. If it is determined that the information is a Hello message from the network device, the process returns to step S31. This makes it possible to inhibit any response to the reception of a Hello message.

If it is determined that the received message is not a Hello message, the process advances to step S33 to determine whether the information is a driver install request from the management server 500. If it is determined that the information is a message from other than the management server 500, the process advances to step 334 to provide the OS with the received information to perform normal reception processing. This makes it possible for the client to browse using a Web browser, receive mail, and access a file server on the network.

If it is determined that the received information is a driver install request from the management server 500, the process advances to step S35 to determine whether the requested device driver is installed in the OS.

Assume that the driver install request message from the management server 500 includes the corresponding driver name, the version of the driver, a driver program file, a network device name, and the IP address of the corresponding network device.

In step S35, determination is performed on the basis of such information. If it is determined that the requested device driver has not been installed, the process advances to step S36 to start setup processing for driver installation.

If it is determined in step S35 that the requested device driver has already been installed in the OS, the process advances to step S37 to compare the version of the device driver which has already been installed with the version of the device driver requested from the management server 500 so as to determine whether the version of the requested device driver is new. If it is determined that the requested device driver is newer, the process advances to step S38 to update the installed device driver. If the version of the installed driver is newer than the requested device driver or the same, the driver is not updated.

If, therefore, no driver is upgraded and the power supply of the network device is turned on and off, respectively, at the end and start of operation, each client substantially performs nothing.

A processing procedure of a processing program to be executed when the management server 500 receives a Hello message from the network in this embodiment will be described with reference to the flowchart of FIG. 17.

First of all, in step S51, it is determined whether a Hello message has been received from the network. A Hello message is text data in the XML form. FIG. 18 shows a description example of this message.

Receiving a Hello message indicates that the network device as the issuing source of the message has been connected to the network because, for example, the power supply is turned on. The process therefore advances to step S52 to create a GetMetedataExchange message in the XML form like that shown in FIG. 19 and transmit (unicast) it to the IP address of the network device as the issuing source in order to request device service information.

As a consequence, the corresponding network device transmits the device service information, which is received in step S53. The device service information received at this time is also text data in the XML form. FIG. 20 shows a description example of this data.

The above operation makes it possible to obtain the IP address of the network device as the transmission source of the Hello message and the configuration information of the network device.

The process then advances to step S54 to specify a device group to which the network device as the issuing source of the Hello message belongs by searching the network device DB 562 by using the IP address of the network device as a key.

When the device group is specified, a client group associated with the device group can also be specified. In step S56, a device driver setup request message is transmitted to each client belonging to the client group. This transmission processing is performed in accordance with the scenario set for the corresponding client group (to be described in detail later).

The process then advances to step S57 to determine whether any configuration is added to the previous configuration (assume that the latest configuration is separately stored in the network device DB) of the network device as the issuing source of the Hello message. If there is no information about the previous configuration, that is, a new network device is connected to the network, it is determined that some change has occurred.

If it is determined that some change has occurred, the process advances to step S58 to perform processing in accordance with the scenario set with respect to the network device (to be described in detail later).

Figure 21:
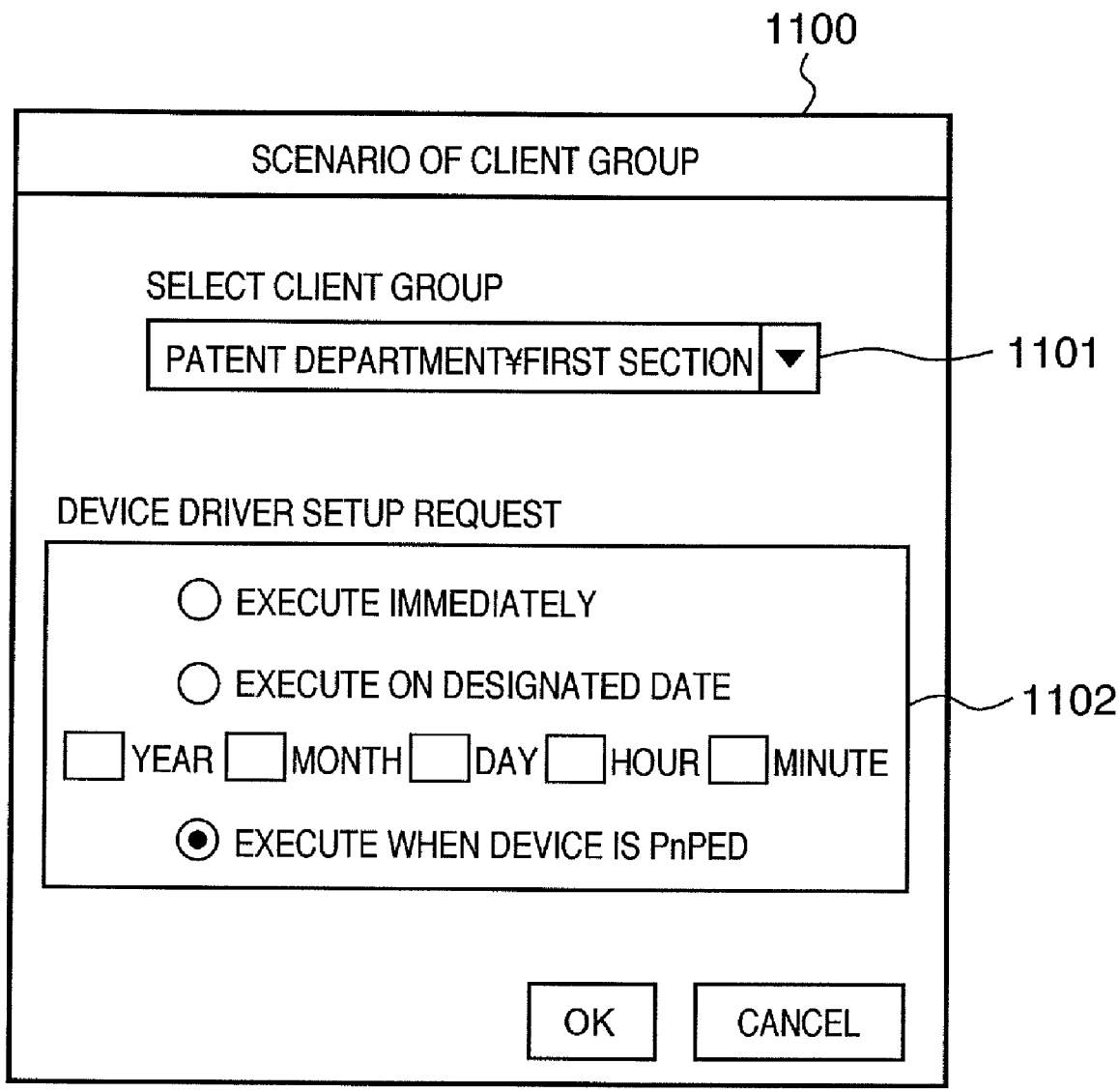
FIG. 21 is a view showing a GUI for scenario creation for a client group in the management server in this embodiment.
Figure 22:
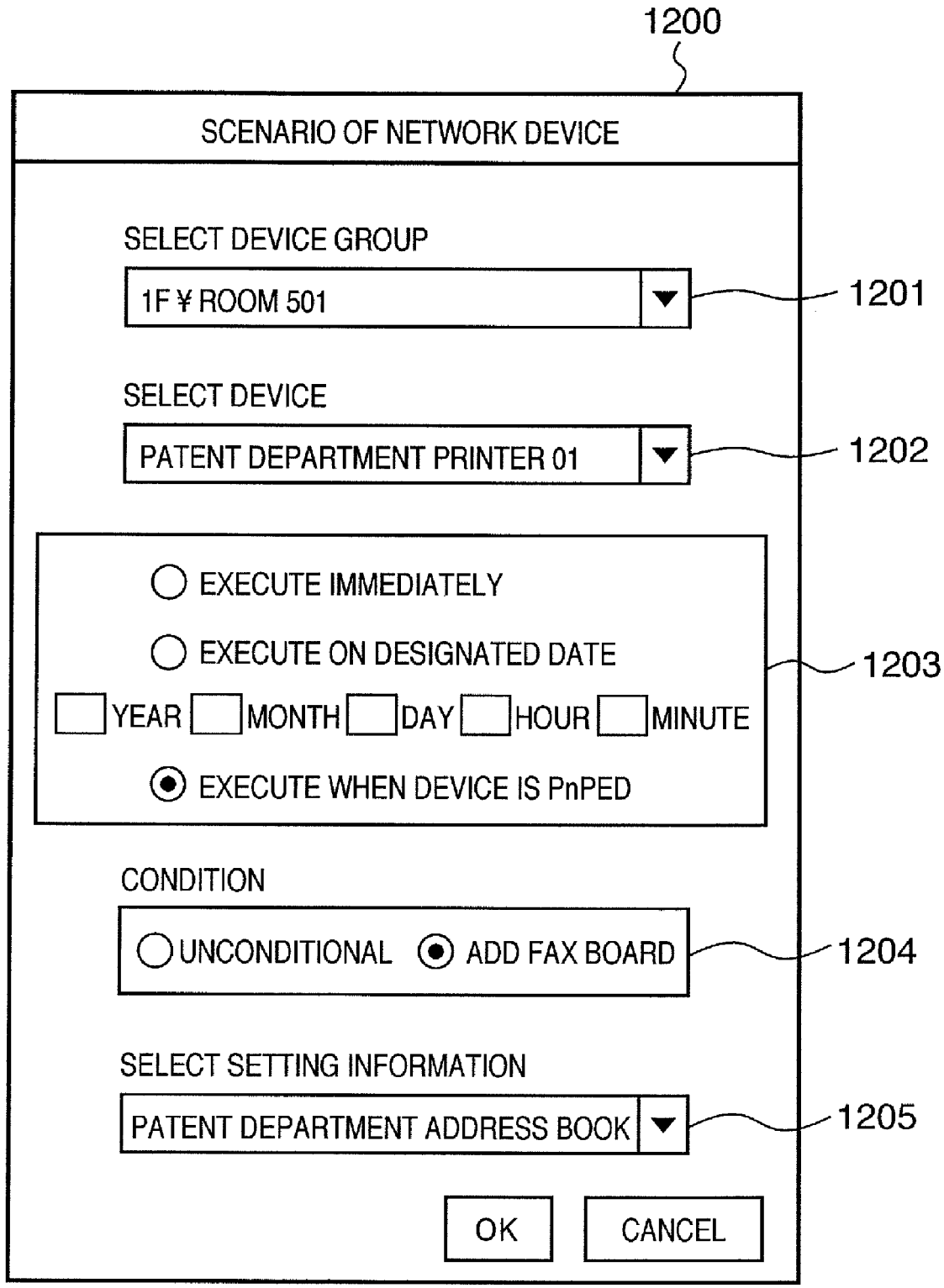
FIG. 22 is a view showing a GUI for scenario creation for a device group in the management server in this embodiment.

Prior to a description of the processing in steps S56 and S58, setting of a scenario in this embodiment will be described below. This scenario is stored in the scenario DB 564. FIGS. 21 and 22 show an example of the GUI of a program to be executed in response to an instruction from the IT administrator when the scenario is stored in the scenario DB 564. FIG. 21 shows a scenario setting window 1100 for a client group. FIG. 22 shows a scenario setting window 1200 for a device.

For example, the IT administrator selects a desired client group by designating a combo box 1101 with the pointing device on the scenario setting window 1100. One of the radio buttons "execute immediately", "execute on designated date", and "execute when device is PnPed" in a selection area 1102 is selected by being clicked. Although this embodiment exemplifies the combo boxes and radio buttons, FIGS. 21 and 22 show examples of such a GUI, and any kind of GUI can be used. In addition, the IT administrator clicks the OK button to determine setting contents.

The meaning of "execute immediately" is that an install request for a device driver for each network device belonging to a device group associated with a selected client group is issued to each client belonging to the client group. In this case, this operation is irrelevant to whether the power supply of the network device is ON.

This case can be easily understood as a case wherein many clients (PCs) are newly installed, and the device drivers of network devices used for them are installed. Since all network devices that can be used can be installed for all clients belonging to a target client group by one operation, the operation load on the IT administrator can reduce.

"Execute on designated date" and "execute when device is PnPed" are associated with step S56 described above.

"Execute on designated date" is selected to install a device driver in an unmanned manner by designating, for example, a late-night time or holiday so as not to interfere with operation by the user of a client PC. Obviously, the power supply of the client has needed to be turned on.

"Execute when device is PnPed" is selected to issue an install request for a device driver for a network device to each client belonging to a corresponding client group when the network device issues a Hello message. Ordinarily, therefore, this button is selected.

The respective network devices belonging to the same device group include various types of devices, e.g., a device designed for color printing, a device for monochrome printing, and a device which allows option boards such as a FAX board to be mounted therein, and hence a scenario must be set for each network device.

As shown in FIG. 22, therefore, there are provided a combo box 1201 for the selection of a device group and a combo box 1202 for the selection of one network device belonging to a selected device group. The meaning of a selection area 1203 is the same as that of the selection area 1102 in FIG. 21.

In addition, the selection items displayed in a condition area 1204 change in accordance with the model of a selected device, and the case in FIG. 22 indicates that a FAX board can be added as an option. In addition, the condition area 1204 indicates that when a configuration matching the condition in the area is added, setting information is set (downloaded) in the corresponding network device. "Unconditional" is set to cope with a case wherein a new network device is purchased with, for example, a FAX board being initially mounted therein.

A combo box 1205 is used to select device information to be set (downloaded) in the corresponding network device. Such information is selected from the device setting information DB 566. FIG. 22 shows a case wherein when a FAX board is added to a network device, "address book for patent department (facsimile telephone number book" is downloaded in the network device.

Note that in the case of a network device having a color print function, a client which uses the device may set a color profile to be used.

With the above setting, scenario information about a client group and each network device in a device group is created and registered in the scenario DB 564. Note that the registered scenario may be edited again.

The processing in step S56 in FIG. 17 will be described with reference to the flowchart of FIG. 23.

First of all, in step S61, scenario information for a target client group (the client group specified in step S55 in FIG. 17) is read out from the scenario DB 564. It is then determined whether the timing of issuing a setup request message for a device driver matches the time of PnP or a designated date.

If it is determined that the timing matches the time of PnP, the process advances to step S62 to create a device driver setup message for the corresponding network device and transmit it to each client belonging to the target client group.

If a date is designated, a device driver setup message for each client is created and registered in a timer queue for issuing it on the set date as in step S62. This processing is then terminated.

Figure 23:
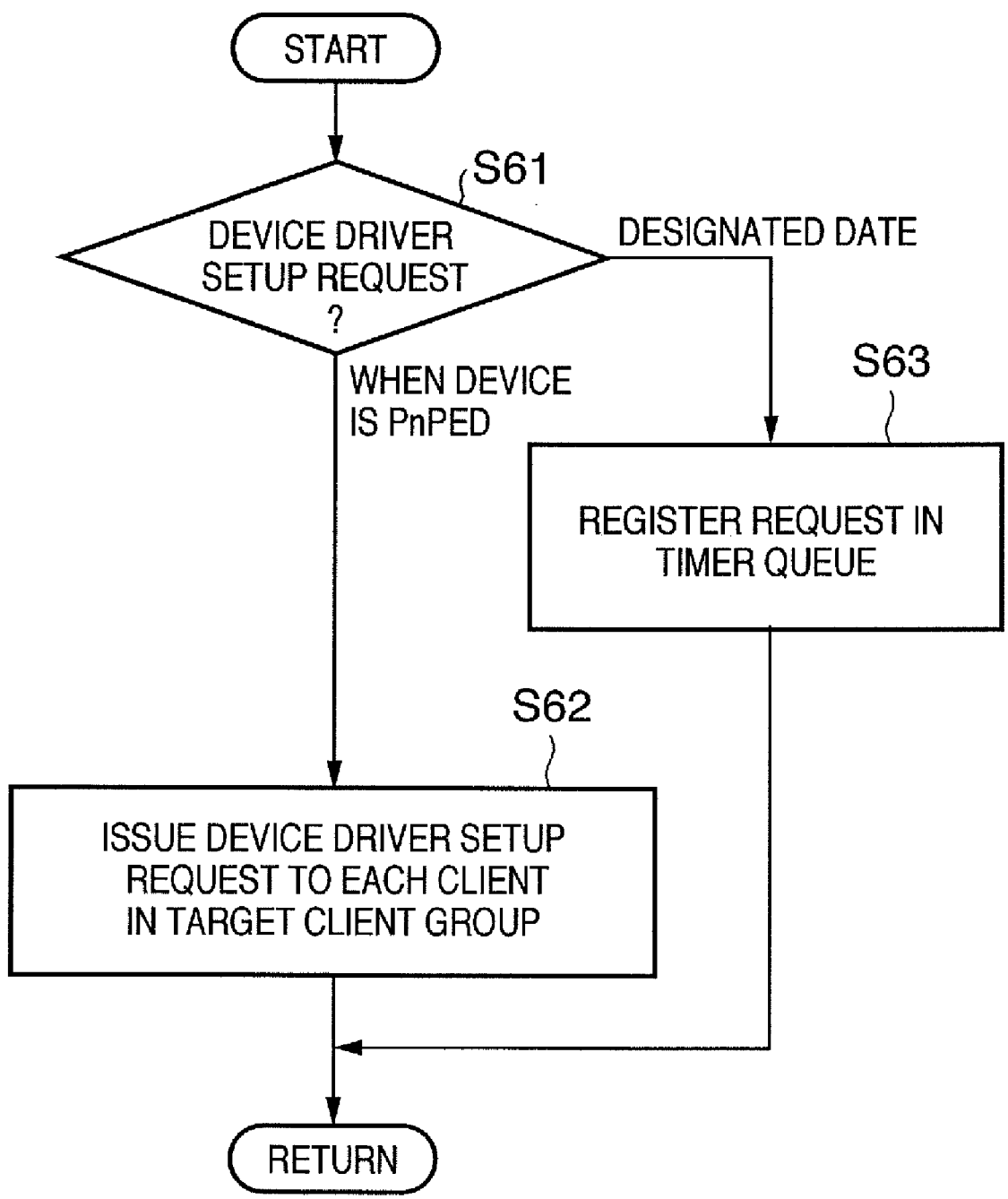
FIG. 23 is a flowchart showing the details of step S56 in FIG. 17.

Note that the processing in step S58 in FIG. 17 is almost the same as that in FIG. 23 except that the transmission destination is a network device and different setting information (e.g., a FAX address book or a color profile) is set for the network device. A description of the processing in step S58 will be omitted.

According to the embodiment described above, the IT administrator groups in advance a plurality of clients on the network and a plurality of network devices in accordance with departments, physical installation positions, and the like and associates the client groups with the device groups. As a consequence, each client constituting executes only setup processing for device drivers for the network devices in the device group associated with the client group.

That is, there is no chance that device drivers for unassociated network devices will be set up. This prevents the limited memory from being cluttered with unnecessary information. In addition, the IT administrator can set the timing of setup processing of device drivers as needed. If, therefore, for example, many clients or many network devices are newly purchased, the IT administrator can make setup processing done for device drivers in an unmanned manner as long as he/she sets a time zone independent of business operation.

In addition, according to this embodiment, only setting information suitable for a client environment in which a network device can be set in the network device, thereby improving the use efficiency of the memory of the network device.

The above will be described in a different manner as follows. Consider a large-scale network in which client groups C1, C2, C3, . . . , and device groups D1, D2, D3, . . . exist. According to this embodiment, if the client group C1 is associated with the device group D1, each client belonging to the client group C1 performs setup processing of the device drivers of only network devices belonging to only the device group D1. That is, with regard to setup processing of device drivers, the above operation indicates as if a logical small-scale network constituted by the client group C1 and the device group D1 can be constructed on an existing large-scale network. In addition, with regard to general access to file servers and the like instead of device drivers, the merits of a large-scale network can be directly utilized.

OTHER EMBODIMENT

In the above embodiment, the management server 500 has been described as a server to be directly operated by the IT administrator. If, however, the management server 500 functions as a Web server, the IT administrator may access the management server 500 from the network client to perform the above various kinds of settings by using a Web browser.

The above embodiment has exemplified the case wherein clients and network devices are managed by using IP addresses. However, when DHCP is used, a client or device may have an IP address different from the previous one every time the power supply is turned on.

In such a network environment, for example, the IT administrator makes setting for a network device to issue a Hello message containing a name set by the administrator, e.g., the character string "patent section 1 printer 01". This makes it possible for the management server 500 to execute the processing in the above embodiment.

Furthermore, this embodiment has exemplified the case wherein the management server 500 mediates processing in response to a Hello message as a trigger. That is, the above description has the premise that the power supply of a network device which has been OFF is turned on. This is because an option board is generally mounted in the network device while the power supply is OFF. Recently, however, an interface typified by a USB interface allows an external function (option hardware) to be connected to the device even while the power supply is ON. In order to cope with this tendency, a network device may notify a change in equipment information when a hardware change event (WS-Event) occurs.

As is obvious from the above description, a characteristic feature of this embodiment lies in processing by the management server 500. As described above, the management server 500 is implemented by application programs executed on the server. Obviously, therefore, the present invention incorporates the computer programs. In addition, computer programs are generally stored in a computer readable storage medium such as a CD-ROM, and are set in a computer. The programs are then copied or installed in the system to be implemented. Obviously, therefore, the present invention incorporates such a computer readable storage medium.

As has been described above, according to the present invention, even in a large-scale network environment in which many client apparatuses and many devices exist on a network, the network can be made to function as an aggregation of logical small-scale networks in the execution of device driver setup. In addition, device driver setup can be automated within a logical small-scale network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-303709, filed Oct. 18, 2005, which is hereby incorporated by reference herein in its entirety.

What is claimed is:

1. A network management apparatus for managing a plurality of client apparatuses and a plurality of network devices, comprising:
   a storage management unit configured to store and manage client group information indicating to which client group each of the plurality of client apparatuses belongs, and device group information indicating to which device group each of the plurality of network devices belongs, and stores connection information which indicates a logical connective relation between a client group and a device group;
   a reception unit configured to receive a predetermined network connection message from a network device through the network;
   a first specifying unit configured to specify, by referring to the device group information stored and managed by said storage management unit, a device group to which the network device which has issued the network connection message received by said reception unit belongs;
   a second specifying unit configured to specify, by referring to the connection information stored in said storage management unit, a client group in a logical connective relation with the device group specified by said first specifying unit; and
   a transmission unit configured to transmit, by referring to the client group information of the client group specified by said second specifying unit, a setup request message for a device driver corresponding to the network device which has issued the network connection message to each client apparatus as a constituent member of the client group specified by said second specifying unit.

2. The apparatus according to claim 1, wherein said first specifying unit specifies, by referring to the device group information stored and managed by said storage management unit, a device group to which the network device that has issued a message indicating that the configuration of the network device has been changed belongs, and
   wherein said second specifying unit specifies a client group in a logical connective relation with the device group specified by said first specifying unit.

3. The apparatus according to claim 1, further comprising a scenario setting unit configured to set, for each client group, a scenario which indicates whether to execute transmission of the setup request message by said transmission unit immediately after said second specifying unit specifies the client group or designates a date and executes the transmission on the designated date.

4. The apparatus according to claim 1, further comprising a unit configured to transmit a setup request message for a device driver of each network device belonging to an associated device group to each client belonging to a desired client group.

5. The apparatus according to claim 1, further comprising:
   a device setting information storage unit configured to store setting information to be set in the network device; and
   a setting unit configured to, when said reception unit receives the predetermined network connection message through a network, read out setting information for a network device as an issuing source of the network connection message from said device setting information storage unit, and to transmit the information to the network device as the issuing source for making the network device set the setting information.

6. The apparatus according to claim 5, further comprising a second scenario setting unit configured to set, for each network device, a scenario which indicates whether to execute transmission of setting information by said setting unit immediately after reception of the network connection message or designates a date and executes the transmission on the designated date.

7. A control method for a network management apparatus which manages a plurality of client apparatuses and a plurality of network devices, and comprises a storage management unit configured to store and manage client group information indicating to which client group each of the plurality of client apparatuses belongs, and device group information indicating to which device group each of the plurality of network devices belongs, and stores connection information which indicates a logical connective relation between a client group and a device group, said method comprising:
   a reception step of receiving a predetermined network connection message from a network device through the network;
   a first specifying in step of specifying, by referring to the device group information stored and managed by the storage management unit, a device group to which the network device which has issued the network connection message received in said reception step belongs;
   a second specifying step of specifying, by referring to the connection information stored in the storage management unit, a client group in a logical connective relation with the device group specified in said first specifying step; and
   a transmission step of transmitting, by referring to the client group information of the client group specified in said second specifying step, a setup request message for a device driver corresponding to the network device which has issued the network connection message to each client apparatus as a constituent member of the client group specified in said second specifying step.

8. A computer-readable storage medium storing, in executable form, a program for controlling a network management apparatus which manages a plurality of client apparatuses and a plurality of network devices, and comprises a storage management unit configured to store and manage client group information indicating to which client group each of the plurality of client apparatuses belongs, and device group information indicating to which device group each of the plurality of network devices belongs, and stores connection information which indicates a logical connective relation between a client group and a device group, execution of the program causing the computer to function as;

a storage management unit configured to store and manage client group information indicating to which client group each of said the plurality of client apparatuses belongs, and device group information indicating to which device group each of the plurality of network devices belongs, and stores connection information which indicates a logical connective relation between a client group and a device group;

a reception unit configured to receive a predetermined network connection message from a network device through the network;

a first specifying unit configured to specify, by referring to the device group information stored and managed by said storage management unit, a device group to which the network device which has issued the network connection message received by said reception unit belongs;

a second specifying unit configured to specify, by referring to the connection information stored in said storage management unit, a client group in a logical connective relation with the device group specified by said first specifying unit; and a transmission unit configured to transmit, by referring to the client group information of the client group specified by said second specifying unit, a setup request message for a device driver corresponding to the network device which has issued the network connection message to each client apparatus as a constituent member of the client group specified by said second specifying unit.

9. A network system comprising a plurality of client apparatuses, a plurality of network devices, and a network management apparatus for managing said plurality of clients and said plurality of network devices, wherein each of said network devices comprises a unit configured to broadcast, when a power supply is turned on, a network connection message to a network, said network management apparatus comprises:

a storage management unit configured to store and manage client group information indicating to which client group each of said plurality of client apparatuses belongs, and device group information indicating to which device group each of said plurality of network devices belongs, and to store connection information which indicates a logical connective relation between a client group and a device group;

a first reception unit configured to receive a network connection message from a network device through the network;

a first specifying unit configured to specify, by referring to the device group information stored and managed by said storage management unit, a device group to which the network device which has issued the network connection message received by said first reception unit belongs;

a second specifying unit configured to specify, by referring to the connection information stored and managed by said storage management unit, a client group in a logical connective relation with the device group specified by said first specifying unit; and a transmission unit configured to transmit, by referring to the client group information of the client group specified by said second specifying unit, a setup request for a device driver corresponding to the network device which has issued the network connection message to each client apparatus as a constituent member of the client group specified by said second specifying unit; and each of said plurality of client apparatuses comprises:

a second reception unit configured to receive the network connection message from said network device and the setup request message from said network management apparatus; and a device driver setup unit configured to execute, by monitoring a message received by said second reception unit, device driver setup processing upon receiving the setup request message without responding to the network connection message.

* * * * *